(12) United States Patent
Sengupta et al.

(10) Patent No.: US 11,832,227 B2
(45) Date of Patent: Nov. 28, 2023

(54) INTERRUPTED TIME DOMAIN RESOURCES FOR A HALF-DUPLEX USER EQUIPMENT WITH A LARGE TIMING ADVANCE

(71) Applicant: QUALCOMM Incorporated, San Diego, CA (US)

(72) Inventors: Ayan Sengupta, San Diego, CA (US); Alberto Rico Alvarino, San Diego, CA (US); Xiao Feng Wang, San Diego, CA (US); Liangping Ma, San Diego, CA (US); Bharat Shrestha, San Diego, CA (US); Peter Gaal, San Diego, CA (US); Le Liu, Fremont, CA (US); Umesh Phuyal, San Diego, CA (US); Jun Ma, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 168 days.

(21) Appl. No.: 17/380,650

(22) Filed: Jul. 20, 2021

(65) Prior Publication Data
US 2022/0053487 A1 Feb. 17, 2022

Related U.S. Application Data

(60) Provisional application No. 62/706,345, filed on Aug. 11, 2020.

(51) Int. Cl.
*H04W 72/04* (2023.01)
*H04L 5/14* (2006.01)
*H04W 72/0446* (2023.01)

(52) U.S. Cl.
CPC ........... *H04W 72/0446* (2013.01); *H04L 5/14* (2013.01)

(58) Field of Classification Search
CPC .............................. H04W 72/0446; H04L 5/14
See application file for complete search history.

(56) References Cited

U.S. PATENT DOCUMENTS

2009/0316593 A1* 12/2009 Wang ................ H04W 74/0833
370/252
2011/0200032 A1* 8/2011 Lindstrom ........ H04W 56/0005
370/350

(Continued)

FOREIGN PATENT DOCUMENTS

WO WO-2018144728 A1 8/2018

OTHER PUBLICATIONS

International Search Report and Written Opinion—PCT/US2021/042584—ISA/EPO—dated Nov. 22, 2021.

*Primary Examiner* — Bailor C Hsu
(74) *Attorney, Agent, or Firm* — Harrity & Harrity, LLP

(57) ABSTRACT

Various aspects of the present disclosure generally relate to wireless communication. In some aspects, a user equipment (UE) may identify a time-domain resource for an uplink transmission. The UE may determine a time period, during which the UE is to refrain from monitoring for downlink communications, based at least in part on the time-domain resource for the uplink transmission and at least one of a first time offset associated with a difference in starting time between an uplink radio frame and a corresponding downlink radio frame at the UE, a second time offset associated with an uplink-downlink timing interaction for the UE, or a network-indicated offset. Numerous other aspects are provided.

30 Claims, 14 Drawing Sheets

(56) References Cited

U.S. PATENT DOCUMENTS

| | | | |
|---|---|---|---|
| 2012/0275362 A1* | 11/2012 | Park | H04W 74/02 370/329 |
| 2013/0100820 A1* | 4/2013 | Song | H04W 52/0216 370/241 |
| 2016/0198408 A1* | 7/2016 | Jhang | H04L 1/1848 370/311 |
| 2016/0338046 A1 | 11/2016 | Chen et al. | |
| 2016/0353376 A1* | 12/2016 | Yi | H04W 74/0833 |
| 2017/0013636 A1* | 1/2017 | Wang | H04W 72/1273 |
| 2017/0142694 A1* | 5/2017 | Yerramalli | H04L 5/0091 |
| 2017/0150340 A1* | 5/2017 | Park | H04W 74/0833 |
| 2017/0171818 A1* | 6/2017 | Agarwal | H04W 52/0216 |
| 2017/0171907 A1 | 6/2017 | Agarwal et al. | |
| 2017/0251518 A1* | 8/2017 | Agiwal | H04W 76/28 |
| 2018/0049272 A1* | 2/2018 | Bagheri | H04L 27/2601 |
| 2018/0097679 A1* | 4/2018 | Zhang | H04L 27/2607 |
| 2019/0007124 A1* | 1/2019 | Seo | H04L 5/0053 |
| 2019/0132157 A1 | 5/2019 | Hosseini et al. | |
| 2019/0191403 A1* | 6/2019 | Goel | H04L 27/2695 |
| 2019/0289544 A1* | 9/2019 | Yi | H04W 74/002 |
| 2019/0342898 A1* | 11/2019 | Nam | H04W 72/0446 |
| 2019/0342944 A1* | 11/2019 | Chatterjee | H04L 5/0082 |
| 2019/0349145 A1* | 11/2019 | You | H04W 16/14 |
| 2020/0053723 A1 | 2/2020 | Hosseini et al. | |
| 2020/0236524 A1 | 7/2020 | Ye et al. | |
| 2020/0383085 A1* | 12/2020 | Shih | H04W 56/005 |
| 2021/0360732 A1* | 11/2021 | Kim | H04W 24/08 |

\* cited by examiner

INTERRUPTED TIME DOMAIN RESOURCES FOR A HALF-DUPLEX USER EQUIPMENT WITH A LARGE TIMING ADVANCE

CROSS-REFERENCE TO RELATED APPLICATION

This Patent Application claims priority to U.S. Provisional Patent Application No. 62/706,345, filed on Aug. 11, 2020, entitled "INTERRUPTED TIME DOMAIN RESOURCES FOR A HALF-DUPLEX USER EQUIPMENT WITH A LARGE TIMING ADVANCE," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for determining interrupted time domain resources for a half-duplex user equipment with a large timing advance.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes identifying a time-domain resource for an uplink transmission; and determining a time period, during which the UE is to refrain from monitoring for downlink communications, based at least in part on the time-domain resource for the uplink transmission and at least one of a first time offset associated with a difference in starting time between an uplink radio frame and a corresponding downlink radio frame at the UE, a second time offset associated with an uplink-downlink timing interaction for the UE, or a network-indicated offset.

In some aspects, a method of wireless communication performed by a base station includes identifying a time-domain resource for an uplink transmission from a UE; and determining a time period during which the UE is to refrain from monitoring for downlink communications based at least in part on the time-domain resource for the uplink transmission and at least one of a first time offset associated with a difference in starting time between an uplink radio frame and a corresponding downlink radio frame at the UE, a second time offset associated with an uplink-downlink timing interaction for the UE, or a network-indicated offset.

In some aspects, a UE for wireless communication includes a memory; and one or more processors coupled to the memory, the memory and the one or more processors configured to identify a time-domain resource for an uplink transmission; and determine a time period, during which the UE is to refrain from monitoring for downlink communications, based at least in part on the time-domain resource for the uplink transmission and at least one of a first time offset associated with a difference in starting time between an uplink radio frame and a corresponding downlink radio frame at the UE, a second time offset associated with an uplink-downlink timing interaction for the UE, or a network-indicated offset.

In some aspects, a base station for wireless communication includes a memory; and one or more processors coupled to the memory, the memory and the one or more processors configured to identify a time-domain resource for an uplink transmission from a UE; and determine a time period during which the UE is to refrain from monitoring for downlink communications based at least in part on the time-domain resource for the uplink transmission and at least one of a first time offset associated with a difference in starting time between an uplink radio frame and a corresponding downlink radio frame at the UE, a second time offset associated with an uplink-downlink timing interaction for the UE, or a network-indicated offset.

In some aspects, a non-transitory computer-readable medium storing a set of instructions for wireless communication includes one or more instructions that, when executed by one or more processors of a UE, cause the UE to identify a time-domain resource for an uplink transmission; and determine a time period, during which the UE is to refrain from monitoring for downlink communications, based at least in part on the time-domain resource for the uplink transmission and at least one of a first time offset associated with a difference in starting time between an uplink radio frame and a corresponding downlink radio frame at the UE, a second time offset associated with an uplink-downlink timing interaction for the UE, or a network-indicated offset.

In some aspects, a non-transitory computer-readable medium storing a set of instructions for wireless communication includes one or more instructions that, when executed by one or more processors of a base station, cause the base station to identify a time-domain resource for an uplink transmission from a UE; and determine a time period during which the UE is to refrain from monitoring for downlink communications based at least in part on the time-domain resource for the uplink transmission and at least one of a first time offset associated with a difference in starting time between an uplink radio frame and a corresponding downlink radio frame at the UE, a second time offset associated with an uplink-downlink timing interaction for the UE, or a network-indicated offset.

In some aspects, an apparatus for wireless communication includes means for identifying a time-domain resource for an uplink transmission; and means for determining a time period, during which the apparatus is to refrain from monitoring for downlink communications, based at least in part on the time-domain resource for the uplink transmission and at least one of a first time offset associated with a difference in starting time between an uplink radio frame and a corresponding downlink radio frame at the apparatus, a second time offset associated with an uplink-downlink timing interaction for the apparatus, or a network-indicated offset.

In some aspects, an apparatus for wireless communication includes means for identifying a time-domain resource for an uplink transmission from a UE; and means for determining a time period during which the UE is to refrain from monitoring for downlink communications based at least in part on the time-domain resource for the uplink transmission and at least one of a first time offset associated with a difference in starting time between an uplink radio frame and a corresponding downlink radio frame at the UE, a second time offset associated with an uplink-downlink timing interaction for the UE, or a network-indicated offset.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, radio frequency chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
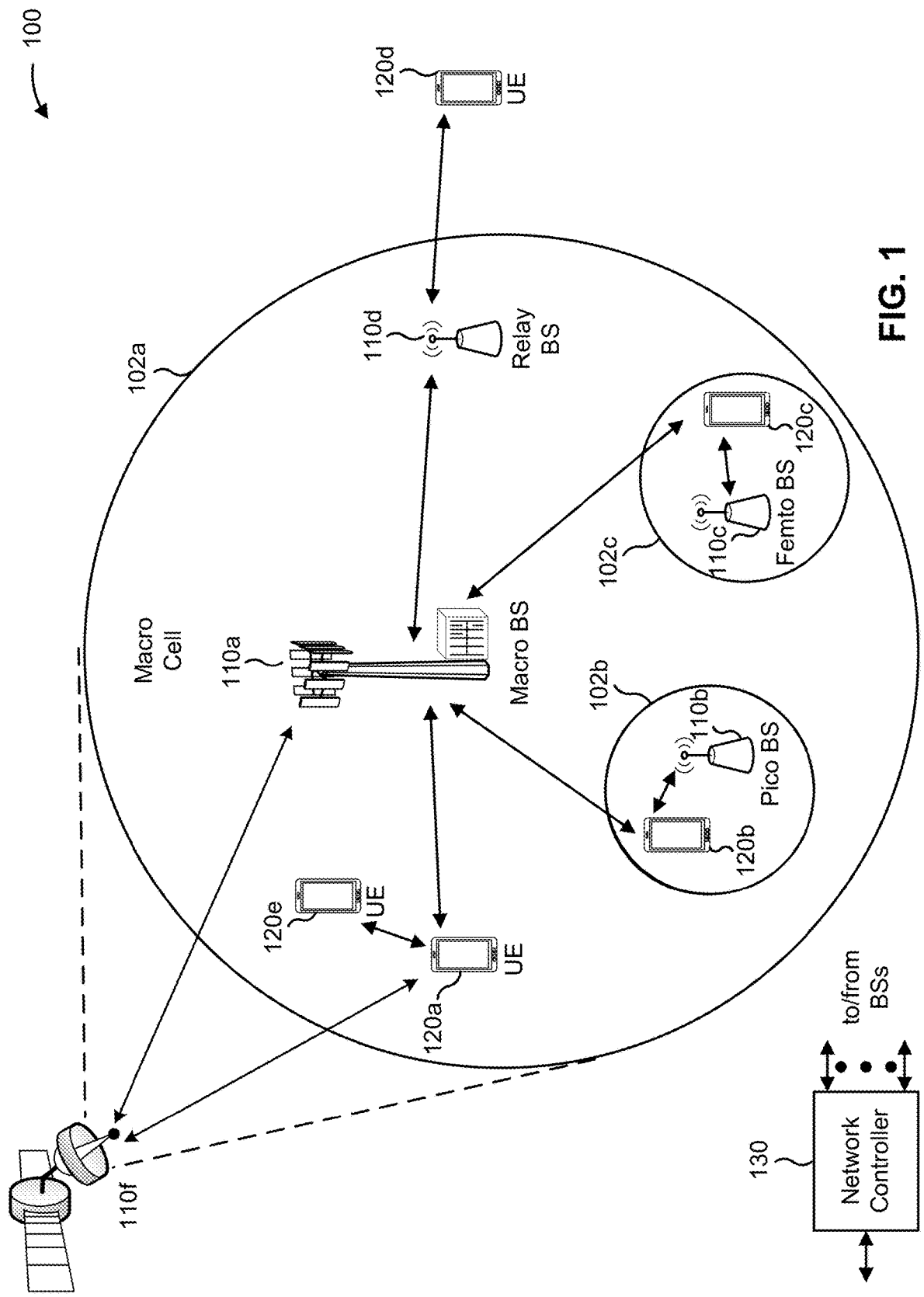
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband interne of things) devices. Some UEs may be considered a Customer Premises Equipment (CPE). Some UEs may be half-duplex UEs that are not capable of simultaneous transmission and reception. Examples of half-duplex UEs include MTC UEs, eMTC UEs, and IoT devices. UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

In some aspects, the wireless network 100 may include one or more non-terrestrial network (NTN) deployments in which a non-terrestrial wireless communication device may include a satellite 110f (referred to herein, interchangeably, as a "non-terrestrial BS," "non-terrestrial base station," "satellite base station," or "satellite"), a relay station (referred to herein, interchangeably, as a "non-terrestrial relay station" or "satellite relay station"), and/or the like. As used herein, "NTN" may refer to a network for which access is facilitated by a non-terrestrial satellite, a non-terrestrial relay station, a non-terrestrial base station, and/or the like. A satellite (e.g., satellite 110f) may provide a non-terrestrial cell, which may at least partially overlap with one or more cells provided by ground-based BSs, may encompass one or more cells provided by ground-based BSs, and/or the like. In some aspects, a satellite 110f may be associated with a ground-based BS. In some aspects, a BS may be mounted on a satellite 110f.

The wireless network 100 may include any number of non-terrestrial wireless communication devices. A non-terrestrial wireless communication device may include a satellite, a high-altitude platform (HAP), and/or the like. A HAP may include a balloon, a dirigible, an airplane, an unmanned aerial vehicle, and/or the like. A non-terrestrial wireless communication device may be part of an NTN that is separate from the wireless network 100. Alternatively, an NTN may be part of the wireless network 100. Satellites may communicate directly and/or indirectly with other entities in wireless network 100 using satellite communication. The other entities may include UEs, other satellites in the one or more NTN deployments, other types of BSs (e.g., stationary or ground-based BSs), relay stations, one or more components and/or devices included in a core network of wireless network 100, and/or the like.

As indicated above, FIG. 1 is provided as an example. Other examples may differ from what is described with regard to FIG. 1.

Figure 2:
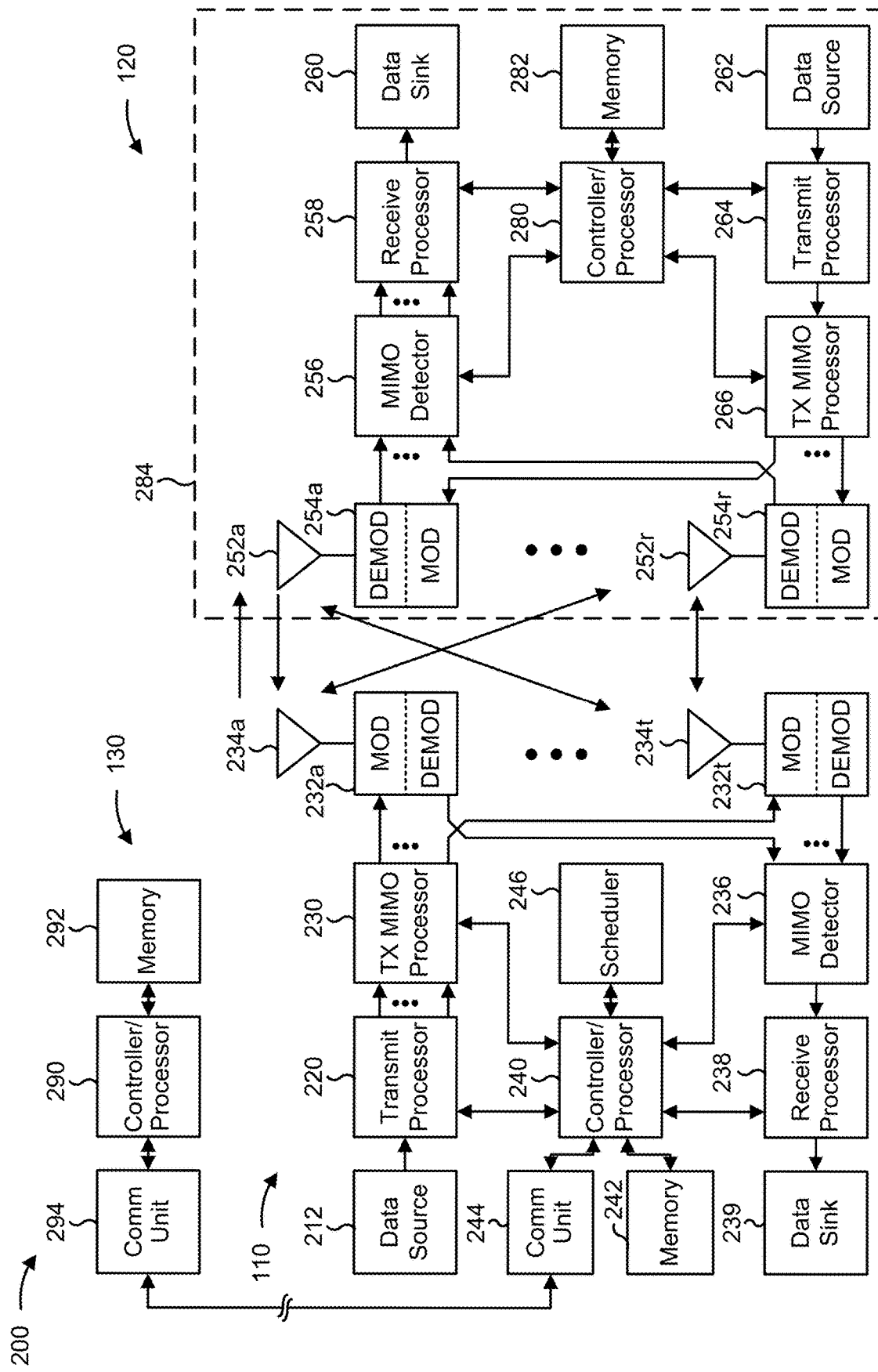
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MC S) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 6A-6C, 7, and/or 8).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 6A-6C, 7, and/or 8).

Controller/processor 240 of base station 110, controller/processor 280 of UE 120, and/or any other component(s) of FIG. 2 may perform one or more techniques associated with determining interrupted time domain resources for half-duplex user equipment with large timing advance, as described in more detail elsewhere herein. For example, controller/processor 240 of base station 110, controller/processor 280 of UE 120, and/or any other component(s) of FIG. 2 may perform or direct operations of, for example, process 700 of FIG. 7, process 800 of FIG. 8, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 700 of FIG. 7, process 800 of FIG. 8, and/or other processes as described herein. In some aspects, executing instructions may include running the instructions, converting the instructions, compiling the instructions, and/or interpreting the instructions, among other examples.

In some aspects, UE 120 may include means for identifying a time-domain resource for an uplink transmission, means for determining a time period, during which the UE 120 is to refrain from monitoring for downlink communications, based at least in part on the time-domain resource for the uplink transmission and at least one of a first time offset associated with a difference in starting time between an uplink radio frame and a corresponding downlink radio frame at the UE 120, a second time offset associated with an uplink-downlink timing interaction for the UE 120, or a network-indicated offset, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 (e.g., satellite 110f) may include means for identifying a time-domain resource for an uplink transmission from a UE 120, means for determining a time period during which the UE 120 is to refrain from monitoring for downlink communications based at least in part on the time-domain resource for the uplink transmission and at least one of, a first time offset associated with a difference in starting time between an uplink radio frame and a corresponding downlink radio frame at the UE 120, a second time offset associated with an uplink-downlink timing interaction for the UE 120, or a network-indicated offset, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
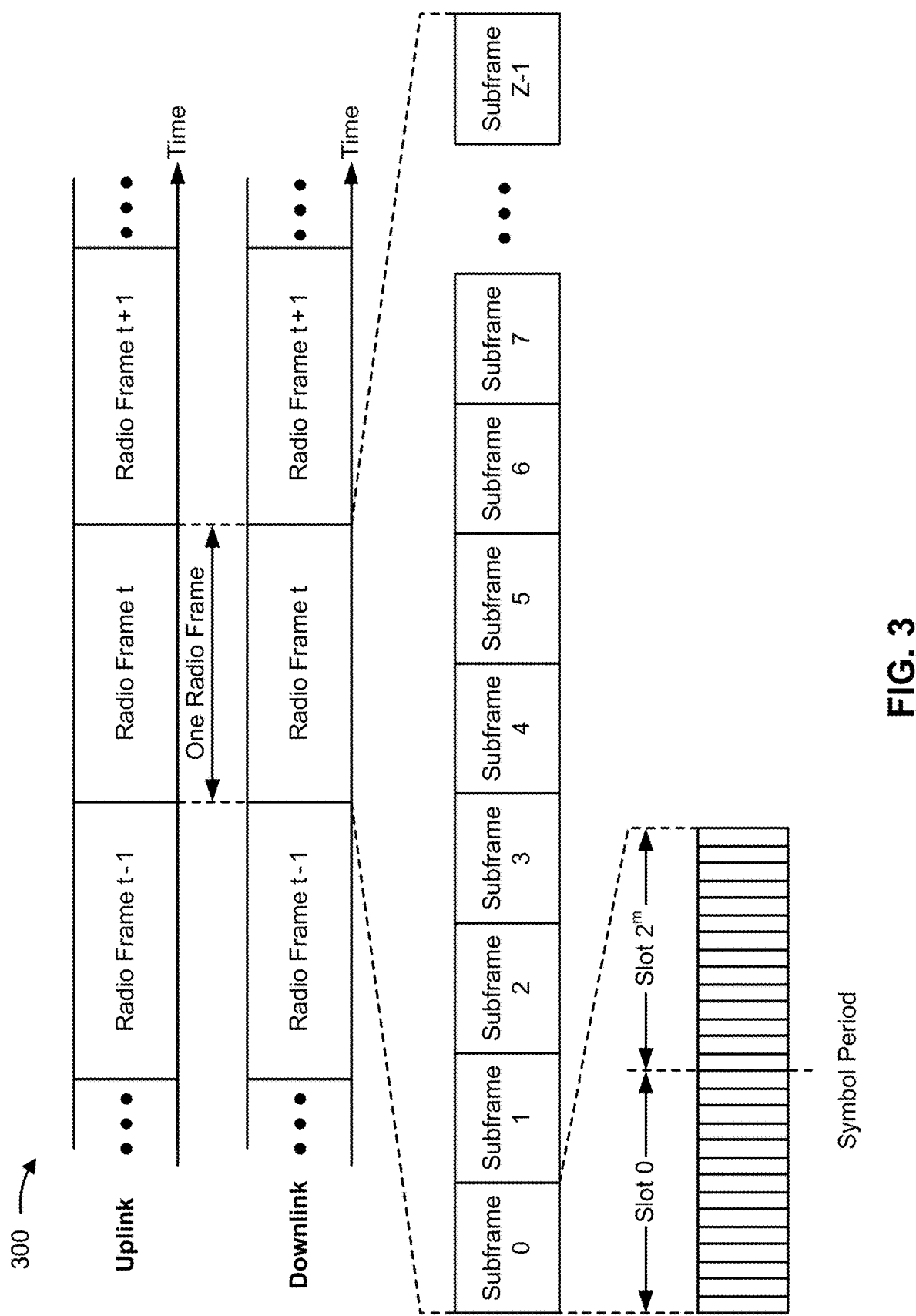
FIG. 3 is a diagram illustrating an example of a frame structure in a wireless communication network, in accordance with the present disclosure.

FIG. 3 is a diagram illustrating an example 300 of a frame structure in a wireless communication network, in accordance with the present disclosure. The frame structure shown in FIG. 3 is for frequency division duplexing (FDD) in a telecommunication system, such as LTE, NR, and/or the like. The transmission timeline for each of the downlink and uplink may be partitioned into units of radio frames (sometimes referred to as frames). Each radio frame may have a predetermined duration (e.g., 10 milliseconds (ms)) and may be partitioned into a set of Z (Z≥1) subframes (e.g., with indices of 0 through Z−1). Each subframe may have a predetermined duration (e.g., 1 ms) and may include a set of slots (e.g., 2 m slots per subframe are shown in FIG. 3, where m is an index of a numerology used for a transmission, such as 0, 1, 2, 3, 4, and/or the like). Each slot may include a set of L symbol periods. For example, each slot may include fourteen symbol periods (e.g., as shown in FIG. 3), seven symbol periods, or another number of symbol periods. In a case where the subframe includes two slots (e.g., when m=1), the subframe may include 2L symbol periods, where the 2L symbol periods in each subframe may be assigned indices of 0 through 2L−1. In some aspects, a scheduling unit for the FDD may be frame-based, subframe-based, slot-based, mini-slot based, symbol-based, and/or the like.

As indicated above, FIG. 3 is provided as an example. Other examples may differ from what is described with respect to FIG. 3.

Figure 4:
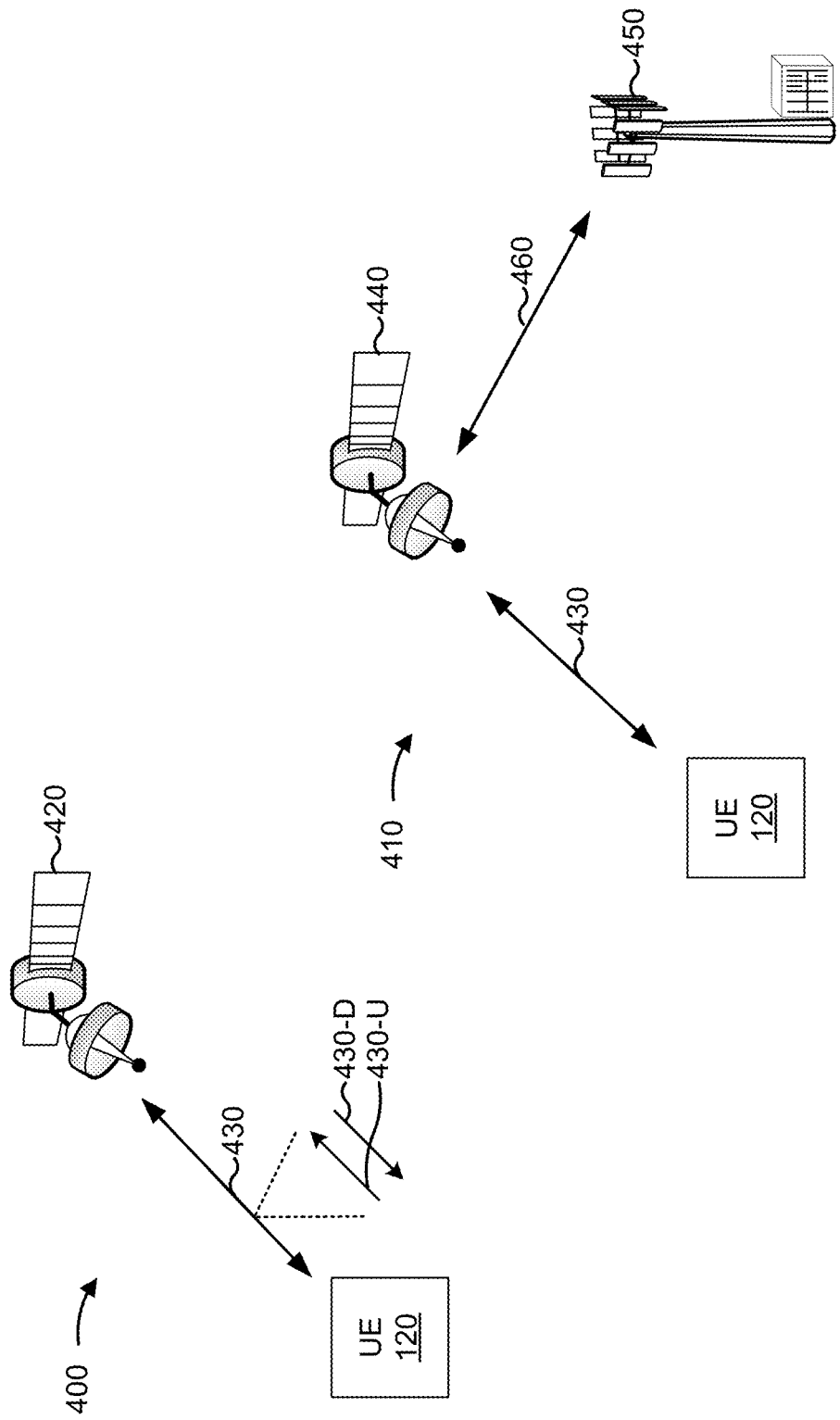
FIG. 4 is a diagram illustrating an example of a regenerative satellite deployment and an example of a transparent satellite deployment in a non-terrestrial network, in accordance with the present disclosure.

FIG. 4 is a diagram illustrating an example 400 of a regenerative satellite deployment and an example 410 of a transparent satellite deployment in a non-terrestrial network, in accordance with the present disclosure.

Example 400 shows a regenerative satellite deployment. In example 400, a UE 120 is served by a satellite 420 via a service link 430. For example, the satellite 420 may include a satellite 110f. In some aspects, the satellite 420 may be referred to as a non-terrestrial base station, a regenerative repeater, an on-board processing repeater, and/or the like. In some aspects, the satellite 420 may demodulate an uplink radio frequency signal, and may modulate a baseband signal derived from the uplink radio signal to produce a downlink radio frequency transmission. The satellite 420 may transmit the downlink radio frequency signal on the service link 430. The satellite 420 may provide a cell that covers the UE 120.

Example 410 shows a transparent satellite deployment, which may also be referred to as a bent-pipe satellite deployment. In example 410, a UE 120 is served by a satellite 440 via the service link 430. The satellite 440 may be a transparent satellite. The satellite 440 may relay a signal received from gateway 450 (e.g., a ground-based BS 110) via a feeder link 460. For example, the satellite may receive an uplink radio frequency transmission, and may transmit a downlink radio frequency transmission without demodulating the uplink radio frequency transmission. In some aspects, the satellite may frequency convert the uplink radio frequency transmission received on the service link 430 to a frequency of the uplink radio frequency transmission on the feeder link 460, and may amplify and/or filter the uplink radio frequency transmission. In some aspects, the UEs 120 shown in example 400 and example 410 may be associated with a Global Navigation Satellite System (GNSS) capability, a Global Positioning System (GPS) capability, and/or the like, though not all UEs have such capabilities. The satellite 440 may provide a cell that covers the UE 120.

The service link 430 may include a link between the satellite 440 and the UE 120, and may include one or more of an uplink or a downlink. The feeder link 460 may include a link between the satellite 440 and the gateway 450, and may include one or more of an uplink (e.g., from the UE 120 to the gateway 450) or a downlink (e.g., from the gateway 450 to the UE 120). An uplink of the service link 430 may be indicated by reference number 430-U and a downlink of the service link 430 may be indicated by reference number 430-D. Similarly, an uplink of the feeder link 460 may be indicated by reference number 460-U (not shown in FIG. 4) and a downlink of the feeder link 460 may be indicated by reference number 460-D (not shown in FIG. 4).

The feeder link 460 and the service link 430 may each experience Doppler effects due to the movement of the satellites 420 and 440, and potentially movement of a UE 120. These Doppler effects may be significantly larger than in a terrestrial network. The Doppler effect on the feeder link 460 may be compensated for to some degree, but may still be associated with some amount of uncompensated frequency error. Furthermore, the gateway 450 may be associated with a residual frequency error, and/or the satellite 420/440 may be associated with an on-board frequency error. These sources of frequency error may cause a received downlink frequency at the UE 120 to drift from a target downlink frequency.

As indicated above, FIG. 4 is provided as an example. Other examples may differ from what is described with regard to FIG. 4.

Figure 5:
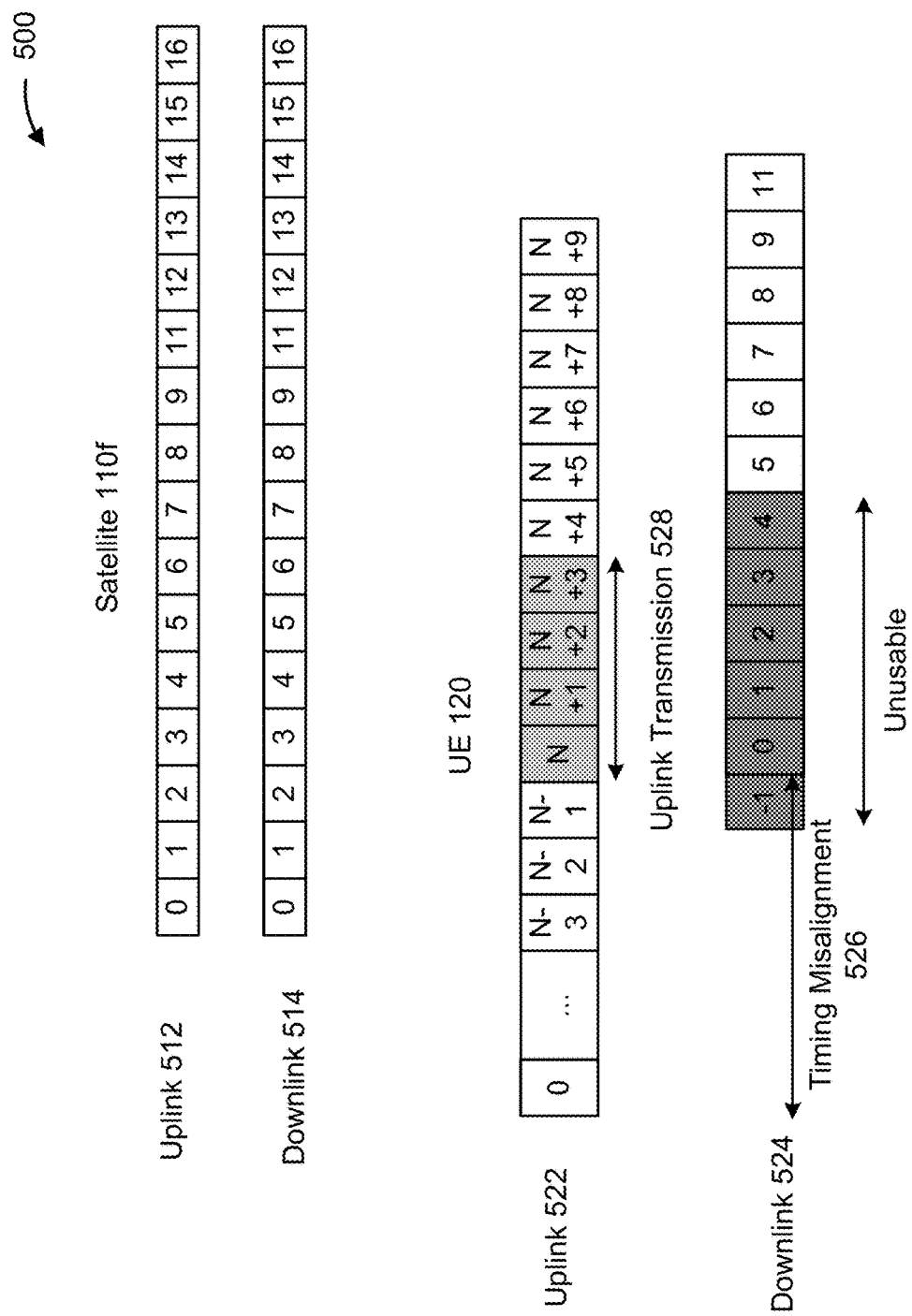
FIG. 5 is a diagram illustrating an example of timing alignment in a non-terrestrial network, in accordance with the present disclosure.

FIG. 5 is a diagram illustrating an example 500 of timing alignment in a non-terrestrial network, in accordance with the present disclosure. As shown in FIG. 5, a satellite 110f, a satellite 420, or a satellite 440 may be timing aligned in terms of its uplink frame and corresponding downlink frame, while a UE 120 served in a non-terrestrial cell of the satellite 110f is timing misaligned.

As shown in FIG. 5, the satellite 110f may be associated with an uplink radio frame timing 512 that includes a plurality of uplink time domain resources (e.g., slots or subframes 0-16) for uplink communication in the non-terrestrial cell, and may be associated with a downlink radio frame timing 514 that includes a plurality of downlink time domain resources (e.g., slots or subframes 0-16) for downlink communication in the non-terrestrial cell. From the perspective of the satellite 110f, the uplink radio frame timing 512 and the downlink radio frame timing 514 is timing aligned in that slot or subframe 0 of the uplink radio frame timing 512 is aligned in the time domain with slot or subframe 0 of the downlink radio frame timing 314. In other words, slot or subframe 0 of the uplink radio frame timing 512 and slot or subframe 0 of the downlink radio frame timing 514 have the same starting time.

Due to the distance between the UE 120 and the satellite 110f, a propagation delay occurs for communications between the UE 120 and the satellite 110f. As a result, from the perspective of the UE 120, an uplink radio frame timing 522 and a downlink radio frame timing 524 for the UE 120 are timing misaligned (e.g., misaligned in the time domain). In other words, as shown in FIG. 5, slot or subframe 0 of the uplink radio frame timing 522 and slot or subframe 0 of the downlink radio frame timing 524 have different starting times in the time domain.

In some aspects, the UE 120 determines a timing misalignment 526 between the uplink radio frame timing 522 and the downlink radio frame timing 524. The timing misalignment 526 may include an offset of N slots or subframes (or another quantity of time-domain resources, or another time duration, and/or the like) associated with a difference in starting time between an uplink radio frame and a corresponding downlink radio frame at the UE (e.g., between slot or subframe 0 of the uplink radio frame timing 522 and slot or subframe 0 of the downlink radio frame timing 524). In these examples, the UE 120 may start an uplink transmission 528 early (e.g., based at least in part on the timing misalignment 526) to compensate for the propagation delay between the UE 120 and the satellite 110f.

If the UE 120 is a half-duplex UE (or another type of UE that is unable to perform simultaneous transmission and reception, such as an MTC UE, an IoT device, and/or the like), the slots or subframes used for the uplink transmission 528 may be unusable for downlink reception for the UE 120. Moreover, slots, subframes or other time-domain resources on both sides of the slots or subframes used for the uplink transmission 528 may not be usable to provide guard periods or guard intervals for the UE 120 to transition between transmission and reception.

Propagation distances may be relatively large between the UE 120 and the satellite 110f for non-terrestrial communication. As a result, the timing misalignment 526 may be a relatively large value on the order of several subframes or radio frames. In these examples, the satellite 110f may signal a relatively large offset (e.g., a $K_{offset}$) to the UE 120 for communications comprising an uplink-downlink timing interaction associated with the UE 120. The $K_{offset}$ may be used to compensate for the large timing misalignment 526 and to ensure valid scheduling for UE 120. "Uplink-downlink interaction" may refer to an association between reception of a downlink communication at the UE 120 and transmission of a subsequent and corresponding uplink communication by the UE 120. For example, the satellite 110f may configure a $K_{offset}$ for the UE 120 to provide hybrid automatic repeat request (HARQ) feedback on a physical uplink control channel (PUCCH) or on a narrowband physical uplink shared channel (NPUSCH) corresponding to a physical downlink shared channel (PDSCH) or a narrowband PDSCH (NPDSCH) communication received from the satellite 110f. In these examples, the UE 120 may use the $K_{offset}$ for determining uplink timing for the HARQ feedback (e.g., the transmission of the HARQ feedback may start from uplink slot or subframe index n+k+$K_{offset}$, where n is the last downlink subframe in which the PDSCH communication was transmitted, k is a slot offset, and $K_{offset}$ is an offset that is a function of the round-trip-time (RTT) associated with the UE 120 (or with a group of UEs) to ensure valid uplink scheduling. For example, in FIG. 5, corresponding to any downlink transmission ending in subframe or slot 0, the UE 120 cannot transmit a corresponding uplink transmission before its uplink slot N+1. For NTN, the value of the timing misalignment N in this example may be very large. The $K_{offset}$ (e.g., in the HARQ ACK timeline example above) ensures that valid scheduling is maintained even for large values of timing misalignments. In some aspects, the satellite 110f may determine the $K_{offset}$ based at least in part on the timing misalignment 526 determined by the UE 120 (e.g., if signaled to the satellite 110f) or may determine the $K_{offset}$ independent of the timing misalignment 526.

As indicated above, FIG. 5 is provided as an example. Other examples may differ from what is described with regard to FIG. 5.

For half-duplex UEs in a wireless network, uplink-timing interactions may be configured to allow for downlink interrupted subframes for efficient half-duplex operation. For example, a UE may be scheduled or configured to transmit an uplink signal starting from uplink slot/subframe n to uplink slot/subframe n+$N_{UL}$, where $N_{UL}$ corresponds to the slots/subframes of transmission of the uplink signal. The UE may be required to have an interruption with regards to downlink reception in one or more downlink slots/subframes prior to and/or after the slots/subframes corresponding to the transmission of the uplink signal. "Interrupting the one or more downlink slots/subframes" may refer to a half-duplex behavior of the UE in which the UE refrains from monitoring the one or more downlink slots/subframes for downlink communications. Moreover, a serving base station or satellite may refrain from scheduling or configuring downlink communication reception for the UE during the one or more downlink slots/subframes.

As described above, some half-duplex UEs may operate in a non-terrestrial network, in which a half-duplex UE may have a large timing misalignment between an uplink radio frame timing and a downlink radio frame timing associated with the UE. This large timing misalignment may cause issues with determining which downlink slots/subframes are interrupted for the UE, which can degrade half-duplex operation performance for the UE.

Some aspects described herein provide techniques and apparatuses for determining interrupted time domain resources for half-duplex user equipment with large timing advance. In some aspects, a UE (and an associated base station) may determine a time period during which downlink time-domain resources (e.g., slots, subframes, and/or the like) are interrupted for the UE based at least in part on one or more offsets associated with the UE. The one or more offsets may include a timing advance parameter (e.g., $n_{TA}^{UE}$) that may be at least partially determined based at least in part on a timing misalignment for the UE, may include a $K_{offset}$ for the UE, may include a network-indicated offset, and/or the like. In this way, the UE is capable of accurately determining which downlink time-domain resources (e.g., in terms of the downlink slot/subframe indices) to refrain from monitoring, and the base station is capable of accurately determining which downlink time-domain resources the base station should not schedule for the UE, which improves half-duplex operation performance for the UE.

Figure 6A:
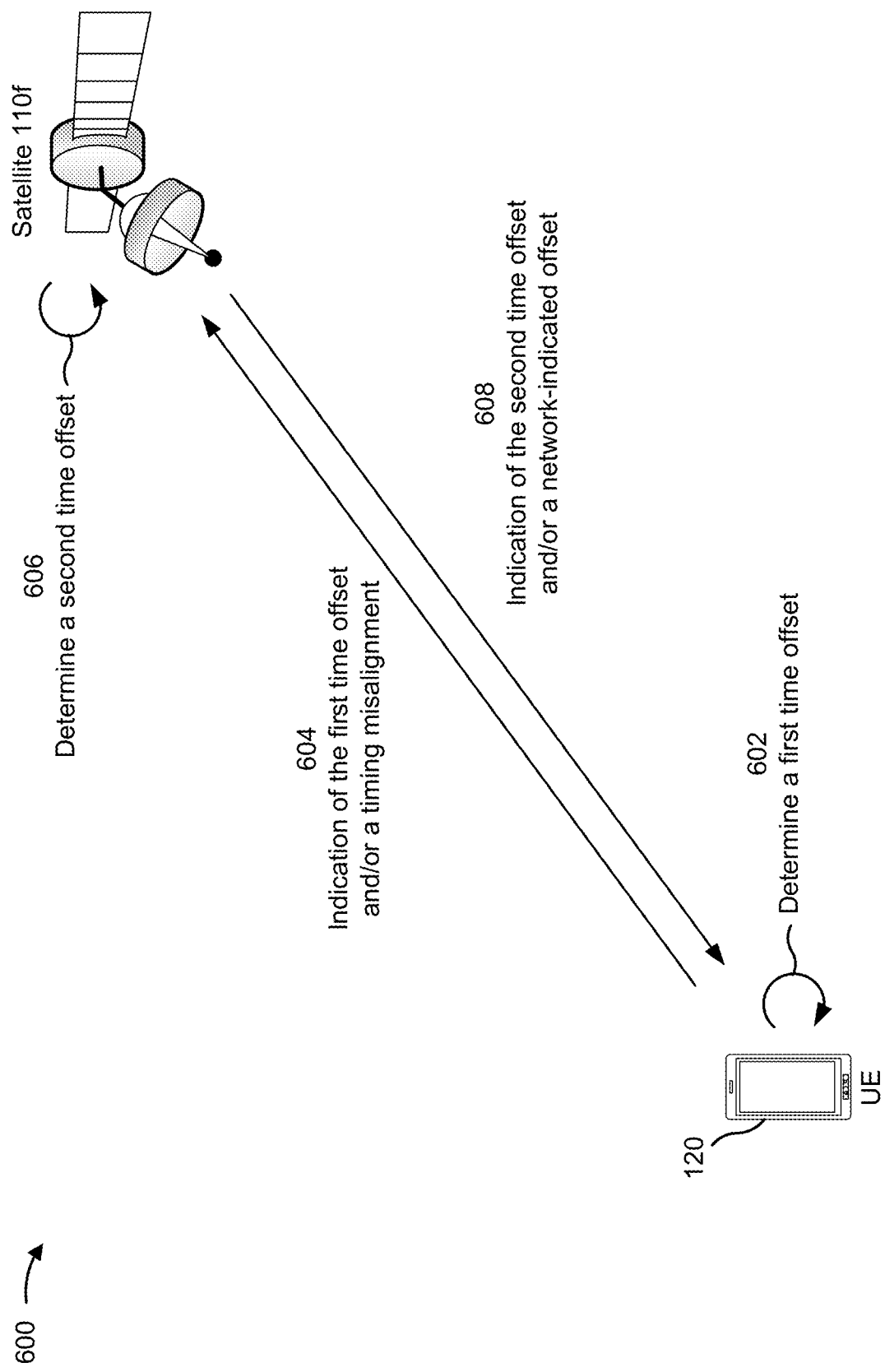
FIGS. 6A-6C are diagrams illustrating examples associated with determining interrupted time domain resources for a half-duplex UE with a large timing advance, in accordance with the present disclosure.
Figure 6B:
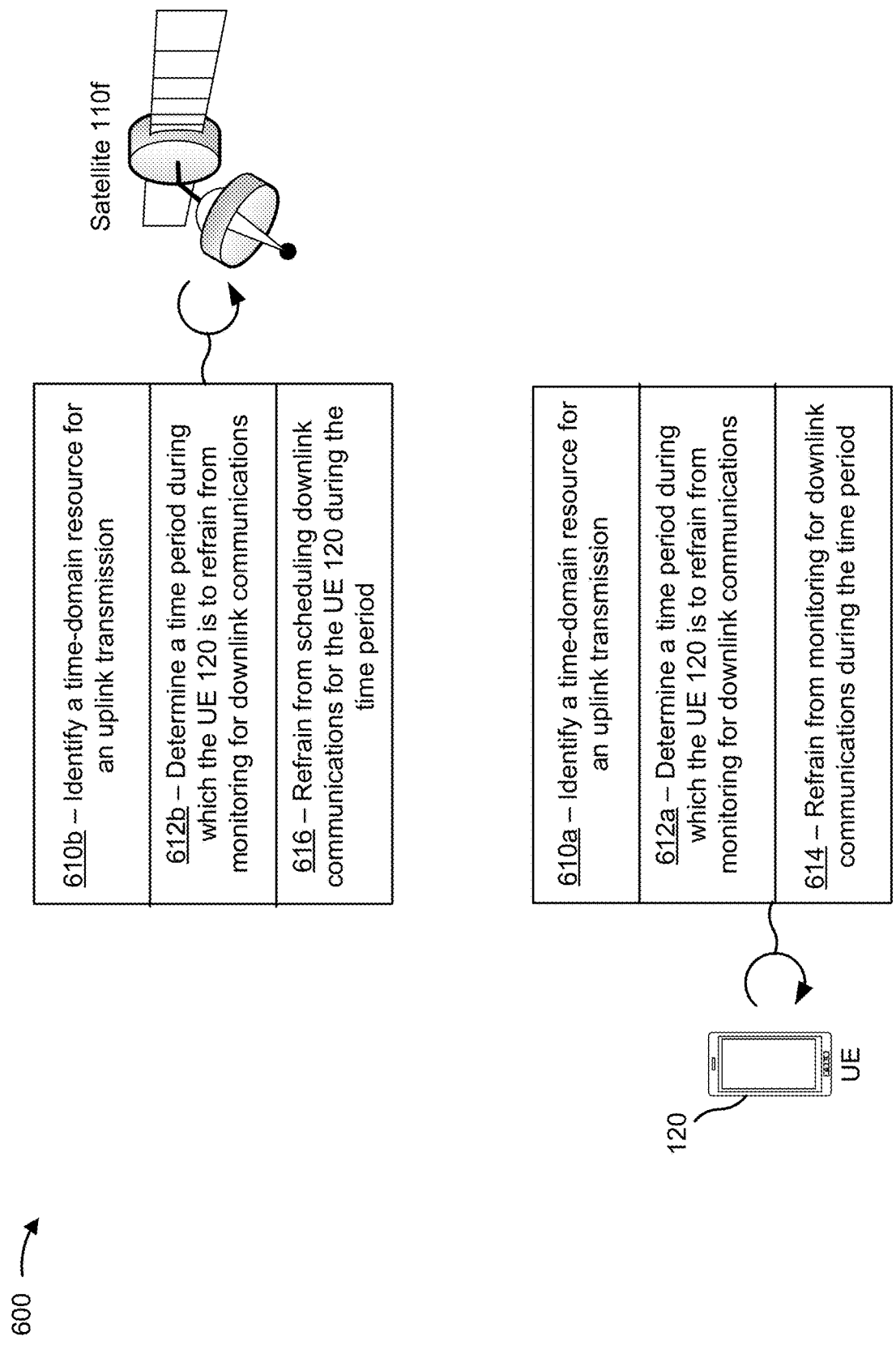
Figure 6C:
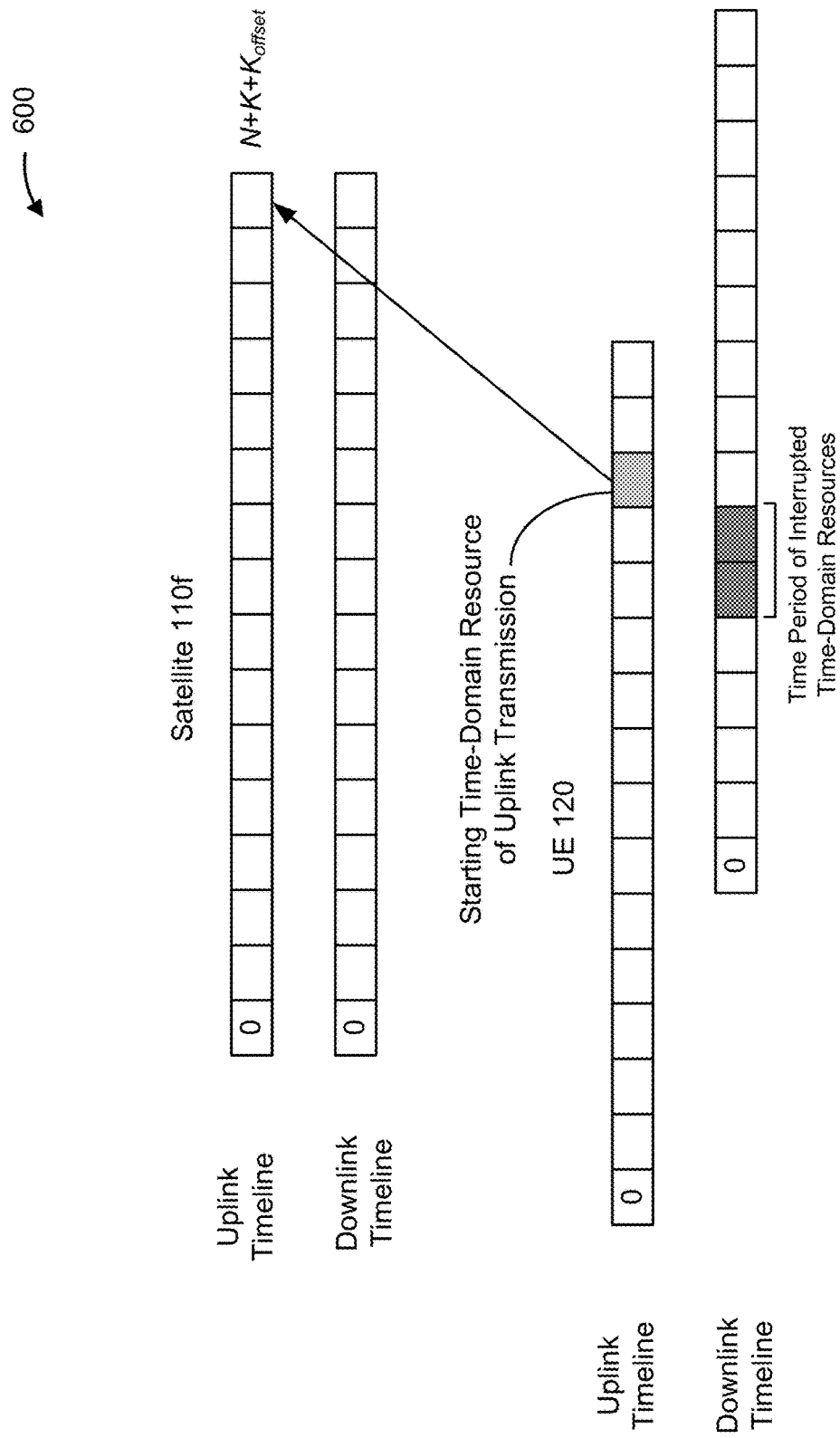

FIGS. 6A-6C are diagrams illustrating one or more examples 600 associated with determining interrupted time domain resources for half-duplex user equipment with large timing advance, in accordance with the present disclosure. As shown in FIG. 6A-6C, example(s) 600 include communication between a satellite 110f (or a satellite 420 or a satellite 440) and a UE 120. In some aspects, the satellite 110f and the UE 120 may be included in a non-terrestrial network, such as non-terrestrial network included in wireless network 100. The satellite 110f and the UE 120 may communicate on a wireless non-terrestrial access link (e.g., service link 430), which may include an uplink (e.g., uplink 430-U) and a downlink (e.g., downlink 430-D). Scheduling of communications on the uplink and the downlink may be based at least in part on an uplink radio frame timing (e.g., the uplink radio frame timing 512, the uplink radio frame timing 522, and/or the like) and/or a downlink radio frame timing (e.g., the downlink radio frame timing 514, the downlink radio frame timing 524, and/or the like).

Figure 9:
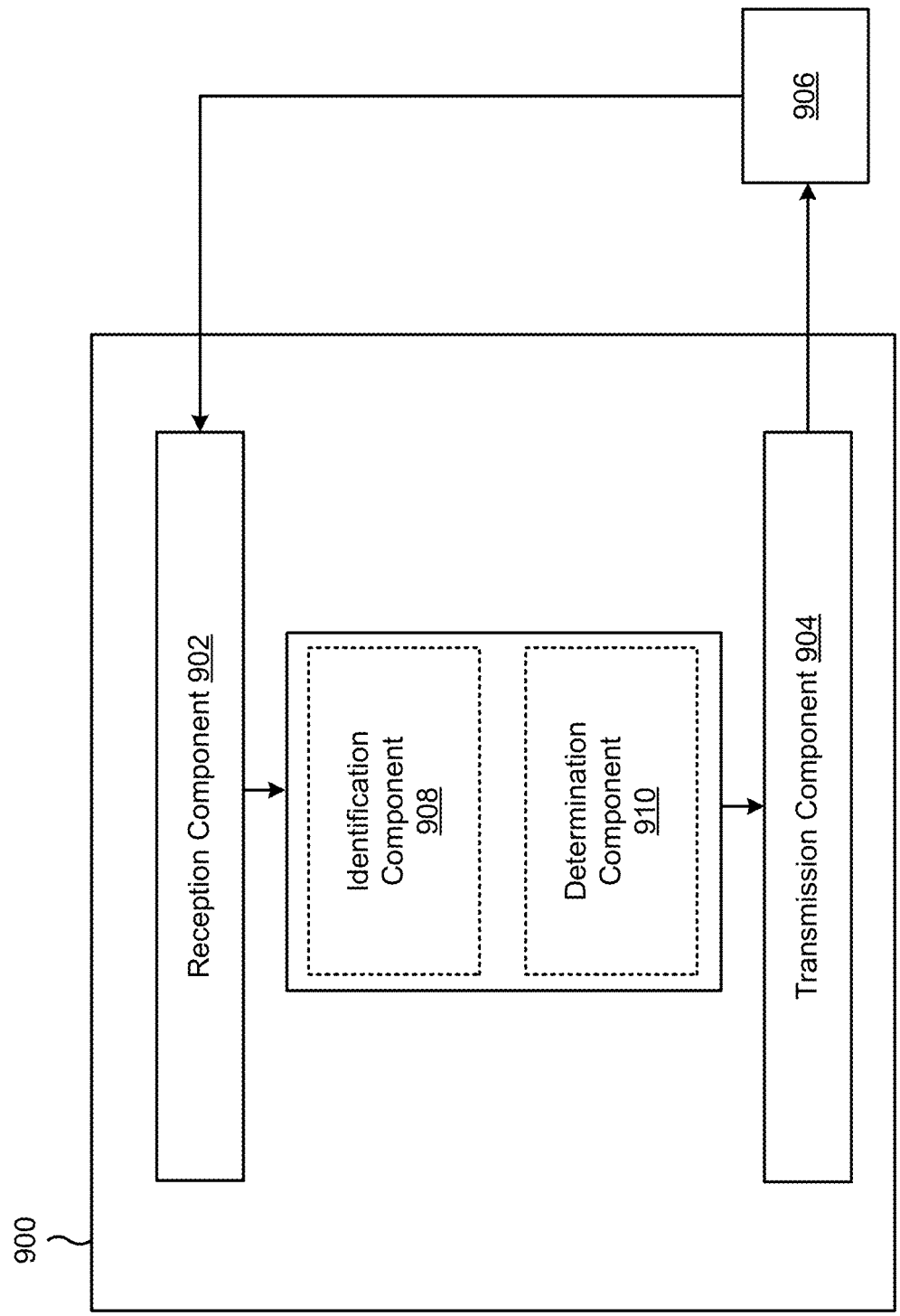
FIG. 9 is a block diagram of an example apparatus for wireless communication, in accordance with the present disclosure.

As shown in FIG. 6A, and by reference number 602, the UE 120 may determine (e.g., using receive processor 258, transmit processor 264, controller/processor 280, memory 282, determination component 910 of FIG. 9, and/or the like) a first time offset. The first time offset may be an offset that is associated with a difference in starting time between an uplink radio frame and a corresponding downlink radio frame at the UE. For example, the first time offset may be a timing advance parameter (e.g., $n_{TA}^{UE}$) that at least partially corresponds to the timing misalignment (e.g., timing misalignment 526) for the UE 120.

In some aspects, the UE 120 determines (e.g., using receive processor 258, transmit processor 264, controller/processor 280, memory 282, determination component 910, and/or the like) the timing advance parameter solely based on the timing misalignment of the UE 120 (e.g., independently of a timing advance command received from the satellite 110f). In these cases, the value of the timing advance parameter includes the UE-estimated pre-compensation delay corresponding to the UE 120, which the UE 120 determines (e.g., using receive processor 258, transmit processor 264, controller/processor 280, memory 282, determination component 910, and/or the like) based at least in part on the geolocation of the UE 120, the geolocation of the satellite 110f, a round-trip time between the UE 120 (or a group of UEs including the UE 120) and the satellite 110f, and/or the like.

In some aspects, the UE 120 determines (e.g., using receive processor 258, transmit processor 264, controller/processor 280, memory 282, determination component 910, and/or the like) the timing advance parameter based on a combination of the timing misalignment of the UE 120 and a small or residual timing advance received from the satellite 110f (e.g., in a random access response (RAR)).

In some aspects, the UE 120 determines (e.g., using receive processor 258, transmit processor 264, controller/processor 280, memory 282, determination component 910, and/or the like) to include the timing advance parameter in the first time offset based at least in part on determining (e.g., using receive processor 258, transmit processor 264, controller/processor 280, memory 282, determination component 910 and/or the like) that the time duration or value of the timing advance parameter satisfies a threshold time duration (e.g., two slots, 5 slots, and/or the like).

In some aspects, the UE 120 determines the value of the first time offset by performing a rounding or quantizing operation on the timing advance parameter (or the timing misalignment). In these cases, the UE 120 rounds or quantizes the timing advance parameter to the nearest quantity of time-domain resources (e.g., to the nearest quantity of symbols, slots, subframes, a combination thereof, and/or the like).

As further shown in FIG. 6A, and by reference number 604, the UE 120 may transmit (e.g., using controller/processor 280, transmit processor 264, TX MIMO processor 266, MOD 254, antenna 252, memory 282, transmission component 904 and/or the like) an indication of the first time offset and/or an indication of the timing misalignment to the satellite 110f. The satellite 110f may receive (e.g., using antenna 234, DEMOD 232, MIMO detector 236, receive processor 238, controller/processor 240, memory 242, reception component 1102 of FIG. 11, and/or the like) the indication of the first time offset and/or the indication of the timing misalignment.

In some aspects, the first time offset may be indicated as an absolute or explicit value. In some aspects, the first time offset may be indicated as a relative value. In these cases, the UE 120 may indicate the value of the first time offset relative to a threshold value. For example, the value indicated for the first time offset may be based on a difference between the timing advance parameter (e.g., the different in starting time between the uplink radio framing timing of the UE 120 and the corresponding downlink radio frame timing of the UE 120) and the threshold value (e.g., a particular quantity of slots, a particular quantity of subframes, and/or the like).

Figure 11:
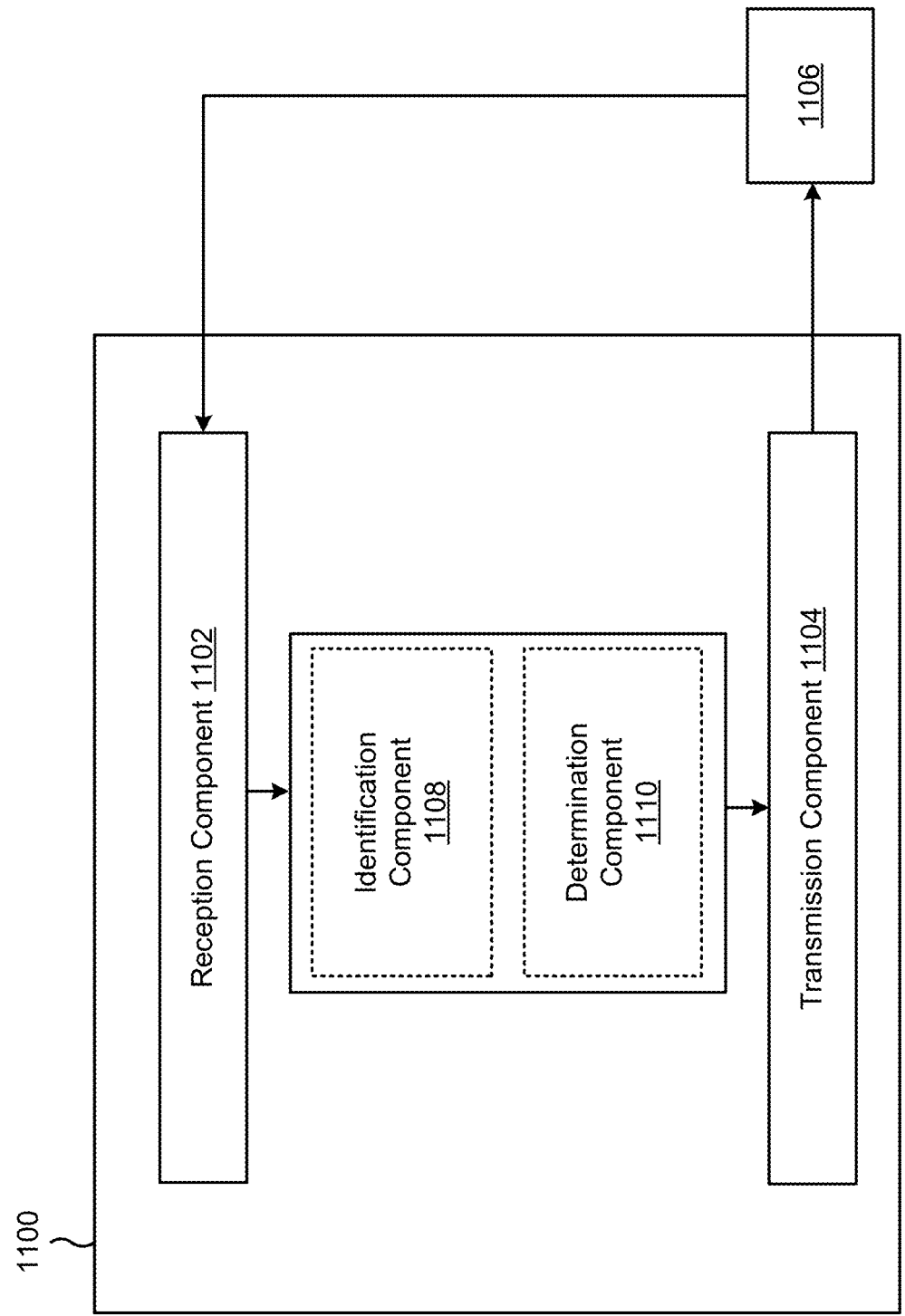
FIG. 11 is a block diagram of an example apparatus for wireless communication, in accordance with the present disclosure.

As further shown in FIG. 6A, and by reference number 606, the satellite 110f may determine (e.g., using transmit processor 220, receive processor 238, controller/processor 240, memory 242, determination component 1110 of FIG. 11, and/or the like) a second time offset. The second time offset may include time-domain offset for an uplink-downlink timing interaction such as a $K_{offset}$. For example, the offset may be a particular time duration (e.g., milliseconds, seconds, and/or the like) or a particular time-domain resource duration (e.g., a quantity of slots, a quantity of subframes, a quantity of radio frames, and/or the like) that is used for an uplink-downlink timing interaction for the UE 120 such that uplink communications transmitted by the UE 120 correspond to a valid scheduling (e.g., the uplink transmission if offset by at least a number of slots equal to the number of slots corresponding to UE 120's timing misalignment). In some aspects, the satellite 110f determines (e.g., using transmit processor 220, receive processor 238, controller/processor 240, memory 242, determination component 1110, and/or the like) the second offset based at least in part an RTT between the UE 120 and the satellite 110f, based at least in part on the timing misalignment received from the UE 120, and/or the like.

As further shown in FIG. 6A, and by reference number 608, the satellite 110f may transmit (e.g., using controller/processor 240, transmit processor 220, TX MIMO processor 230, MOD 232, antenna 234, memory 242, transmission component 1104 of FIG. 11, and/or the like) an indication of the second time offset to the UE 120. The UE 120 may receive (e.g., using antenna 252, DEMOD 254, MIMO detector 256, receive processor 258, controller/processor 280, memory 282, reception component 902 of FIG. 9, and/or the like) the indication of the second time offset from the satellite 110f.

As further shown by reference number 608, the satellite 110f may transmit (e.g., using controller/processor 240, transmit processor 220, TX MIMO processor 230, MOD 232, antenna 234, memory 242, transmission component 1104, and/or the like) an indication of a network-indicated offset to the UE 120. The UE 120 may determine the time period based on the network-indicated offset alone or in combination with one or more of the first time offset and/or the second time offset. The network-indicated offset may include a network-signaled timing advance value for a group of UEs. The network-signaled timing advance value may include a maximum timing advance value across the group of UEs, a minimum timing advance value across the group of UEs, a common timing advance value across the group of UEs, and/or the like.

As shown in FIG. 6B, and by reference numbers 610a and 610b, the UE 120 and/or the satellite 110f may identify a time-domain resource for an uplink transmission. For example, the UE 120 may identify (e.g., using receive processor 258, transmit processor 264, controller/processor 280, memory 282, identification component 908 of FIG. 9, and/or the like) an uplink time-domain resource (e.g., a slot, a subframe, a symbol, or another type of time-domain resource) for transmitting the uplink communication to the satellite 110f, as indicated by reference number 610a. As another example, the satellite 110f may identify (e.g., using transmit processor 220, receive processor 238, controller/processor 240, memory 242, identification component 1108 of FIG. 11, and/or the like) the uplink time-domain resource in which the UE 120 is to transmit the uplink transmission to the satellite 110f, as indicated by reference number 610b. The uplink transmission may be a transmission of a physical uplink shared channel (PUSCH) communication, a physical uplink control channel (PUCCH) communication, a narrowband PUSCH (NPUSCH) format 1 communication, an NPUSCH format 2 transmission, a physical random access channel (PRACH) transmission, a narrowband PRACH (NPRACH) transmission, or another type of uplink communication.

In some aspects, the UE 120 and/or the satellite 110f may identify the time-domain resource based at least in part on an uplink-downlink timing interaction for the UE 120. For example, the UE 120 and/or the satellite 110f may identify the starting time-domain resource for an uplink transmission of an uplink-downlink timing interaction based at least in part on an ending time-domain resource for a corresponding downlink transmission of the uplink-downlink timing interaction. As an example, if the downlink transmission ends in downlink subframe/slot n, the UE 120 and/or the satellite 110f may identify the time-domain resource for the uplink transmission as uplink subframe/slot $n+k+K_{offset}$.

Examples of uplink-downlink timing interactions include a transmission timing for a PUSCH scheduled by a downlink control information (DCI) communication, a transmission timing for a PUSCH scheduled by an RAR during a random access channel (RACH) procedure, a transmission timing for hybrid automatic repeat request (HARD) feedback for a physical downlink shared channel (PDSCH) communication, a medium access control control element (MAC-CE) action timing, a transmission timing for channel state information (CSI) on a PUSCH, a CSI reference resource timing, an aperiodic sounding reference signal (SRS) transmission timing, and/or the like.

As further shown in FIG. 6B, and by reference numbers 612a and 612b, the UE 120 and/or the satellite 110f may determine a time period during which the UE 120 is to refrain from monitoring for downlink communications from the satellite 110f. For example, the UE 120 may determine (e.g., using receive processor 258, transmit processor 264, controller/processor 280, memory 282, determination component 910, and/or the like) the time period based at least in part on the uplink resource, the first time offset, the second time offset, the network-indicated offset (e.g., the network-signaled timing advance value for the group of UEs), and/or the like, as indicated by reference number 612a. As another example, the satellite 110f may determine (e.g., using transmit processor 220, receive processor 238, controller/processor 240, memory 242, determination component 1110, and/or the like) the time period based at least in part on the uplink resource, the first time offset, the second time offset, the network-indicate offset (e.g., the networks-signaled timing advance value for the group of UEs), and/or the like, as indicated by reference number 612b. In some aspects, the UE 120 and/or the satellite 110f may determine the time period by determining downlink time-domain resource indices corresponding to the time period based at least in part on subtracting at least one of the first time offset, the second time offset, or the network-indicated offset, from an uplink time-domain resource index corresponding to the beginning or end of the uplink transmission.

The time period may include a time duration (e.g., in milliseconds, seconds, and/or the like) and/or a time-domain resource duration (e.g., a quantity of symbols, slots, subframes, and/or the like). In some aspects, the time period may occur prior to the time-domain resource for the uplink transmission. For example, if the uplink transmission is to start in uplink time-domain resource $n+k+K_{offset}$, the UE 120 and/or the satellite 110f may determine the starting downlink time-domain resource for the time period immediately preceding the uplink transmission as:

$$n + k - 2 + K_{offset} - n_{TA}^{UE}$$

where n is the ending downlink time-domain resource of a corresponding downlink communication prior to the time-domain resource for the uplink transmission, k is a slot offset, $K_{offset}$ is the second time offset, and $n_{TA}^{UE}$ is the first time offset. The UE 120 and/or the satellite 110f may determine the ending downlink time-domain resource for the time period as:

$$n + k - 1 + K_{offset} - n_{TA}^{UE}$$

In some aspects, the UE 120 and/or the satellite 110f may determine the starting time-domain resource and the ending time-domain resource for the time period without considering the second time offset (e.g., without $K_{offset}$ in the above equations).

In some aspects, the time period may occur in one or more guard intervals or guard periods (which may also be referred to as half-duplex guard periods) associated with the uplink transmission. These guard intervals or guard periods may be time-domain resources that are provided for the UE 120 to transition between a transmission mode and a reception mode in cases where the UE 120 is a half-duplex UE. Thus, the time period may be based at least in part on the UE 120 operating in a half-duplex mode. In some aspects, the UE 120 and/or the satellite 110f may determine the time period to include one or more downlink time-domain resources before the uplink transmission (e.g., the indices of the downlink time-domain resources may be determined based on decrementing the starting index of the uplink transmission by $1+n_{TA}^{UE}$ time-domain resources). In some aspects, the UE 120 and/or the satellite 110f may determine the time period to include one or more downlink time-domain resources after the ending time-domain resource of the uplink transmission (e.g., the indices of the downlink time-domain resources may be determined based on incrementing the ending index of the uplink transmission by $1-n_{TA}^{UE}$).

In some aspects, the time period may occur after the uplink transmission (e.g., in one or more time-domain resources after the ending time-domain resource of the uplink transmission and the guard interval or guard interval after the uplink transmission). For example, the UE 120 and/or the satellite 110f may determine a starting downlink time-domain resource for the time period after the uplink transmission ending in uplink time-domain resource n as:

$$n + 1 - n_{TA}^{UE}$$

and may determine the ending time-domain resource for the time period after the uplink transmission as:

$$n + 3 - n_{TA}^{UE}$$

In some aspects, the UE 120 and/or the satellite 110f may determine a plurality of time durations during which the UE 120 is to refrain from monitoring for downlink communications from the satellite 110f. For example, the UE 120 and/or the satellite 110f may determine a first time duration that includes one or more time-domain resources prior to the uplink transmission, may determine a second time duration that includes one or more time-domain resources in a guard period or guard interval prior to the uplink transmission, may determine a third time duration that includes one or more time-domain resources in a guard period or guard interval after the uplink transmission, may determine a third time duration that includes one or more time-domain resources after the uplink transmission, and/or the like.

As further shown in FIG. 6B, and by reference number 614, the UE 120 may refrain from monitoring (e.g., using antenna 252, DEMOD 254, MIMO detector 256, receive processor 258, controller/processor 280, memory 282, reception component 902, and/or the like) for downlink communications during the time period. As further shown in FIG. 6B, and by reference number 616, the satellite 110f may refrain from scheduling (e.g., using controller/processor 240, transmit processor 220, TX MIMO processor 230, MOD 232, antenna 234, memory 242, scheduler 246, transmission component 1104, and/or the like) downlink communications for reception by the UE 120 during the time period.

FIG. 6C illustrates an example of a time period during which downlink time-domain resources are interrupted for the UE 120. As shown in FIG. 6C, the uplink radio frame timing and the downlink radio frame timing of the UE 120 are timing misaligned by a timing misalignment on which the first time offset, the second time offset, and/or the network-indicated offset may be based. As a result, the UE 120 may start the transmission of an uplink transmission early such that the uplink transmission is received at the satellite 110f at $n+k+K_{offset}$ on the uplink timeline of the satellite. Moreover, based at least in part on the first time offset, the second time offset, and/or the network-indicated offset, the time period of interrupted downlink time-domain resources may be determined to occur prior to the starting time-domain resource of the uplink transmission such that the UE 120 can prepare for transmitting the uplink transmission at the starting time-domain resource of the uplink transmission. For terrestrial networks, the timing misalignment between the UE 120 uplink radio frame timing and the downlink radio fame timing may be relatively small, and the first time offset may be omitted. However, without taking into account at least one of the first time offset, the second time offset, and/or the network-indicated offset (e.g., particularly in non-terrestrial networks), the interrupted time-domain resources might occur long after the uplink transmission, in which case the UE 120 might be expected to monitor the time-domain resources prior to the starting time-domain resource of the uplink transmission.

FIG. 6C is provided to illustrate an example, and other time durations for interrupted time-domain resources may be determined prior to and/or after the time-domain resources of an uplink transmission using the techniques described herein.

In this way, the UE 120 and the satellite 110f may determine a time period during which downlink time-domain resources (e.g., slots, subframes, and/or the like) are interrupted for the UE 120 based at least in part on one or more offsets associated with the UE 120. The one or more offsets may include a timing advance parameter (e.g., $n_{TA}^{UE}$) that may be at least partially determined based at least in part on a timing misalignment for the UE 120, may include a $K_{offset}$ for the UE 120, and/or a network-indicated offset. In this way, the UE 120 is capable of accurately determining which downlink time-domain resources to refrain from monitoring, and the satellite 110f is capable of accurately determining which downlink time-domain resources the satellite 110f should not schedule for the UE 120, which increases half-duplex operation performance for the UE 120.

As indicated above, FIGS. 6A-6C are provided as one or more examples. Other examples may differ from what is described with respect to FIG. 6A-6C.

Figure 7:
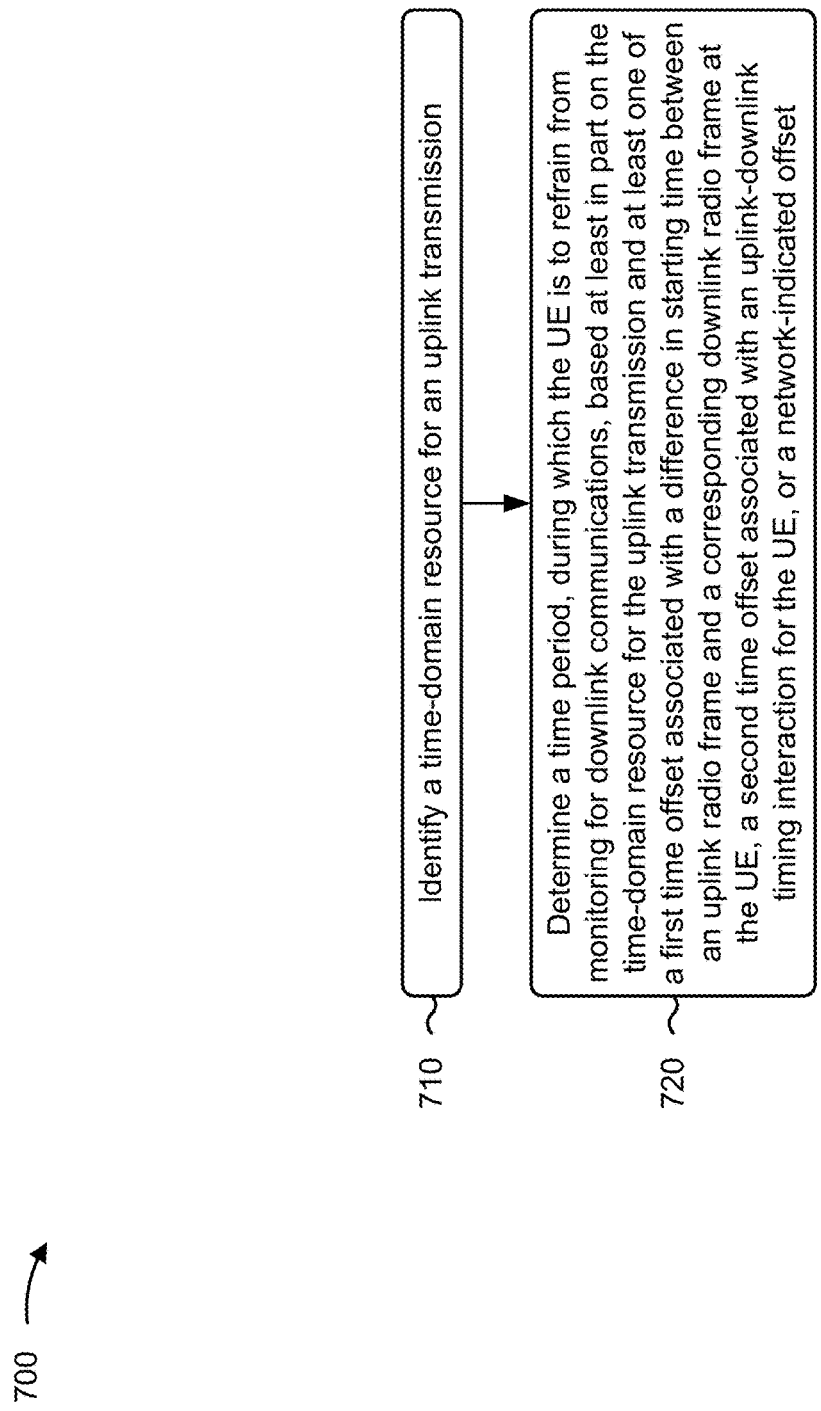
FIGS. 7 and 8 are diagrams illustrating example processes associated with determining interrupted time domain resources for a half-duplex UE with a large timing advance, in accordance with the present disclosure.

FIG. 7 is a diagram illustrating an example process 700 performed, for example, by a UE, in accordance with the present disclosure. Example process 700 is an example where the UE (e.g., UE 120) performs operations associated with determining interrupted time domain resources for a half-duplex UE with a large timing advance.

As shown in FIG. 7, in some aspects, process 700 may include identifying a time-domain resource for an uplink transmission (block 710). For example, the UE (e.g., using receive processor 258, transmit processor 264, controller/processor 280, memory 282, identification component 908, and/or the like) may identify a time-domain resource for an uplink transmission, as described above in connection with FIGS. 6A-6C.

As further shown in FIG. 7, in some aspects, process 700 may include determining a time period, during which the UE is to refrain from monitoring for downlink communications, based at least in part on the time-domain resource for the uplink transmission and at least one of a first time offset associated with a difference in starting time between an uplink radio frame and a corresponding downlink radio frame at the UE, a second time offset associated with an uplink-downlink timing interaction for the UE, or a network-indicated offset (block 720). For example, the UE (e.g., using receive processor 258, transmit processor 264, controller/processor 280, memory 282, determination component 910, and/or the like) may determine a time period, during which the UE is to refrain from monitoring for downlink communications, based at least in part on the time-domain resource for the uplink transmission and at least one of a first time offset associated with a difference in starting time between an uplink radio frame and a corresponding downlink radio frame at the UE, a second time offset associated with an uplink-downlink timing interaction for the UE, or a network-indicated offset, as described above in connection with FIGS. 6A-6C.

Process 700 may include additional aspects, such as any single aspect or any combination of aspects described below and/or in connection with one or more other processes described elsewhere herein.

In a first aspect, the first time offset includes or is based at least in part on a timing advance parameter associated with the UE. In a second aspect, the first time offset, the second time offset, or both are indicated as a quantity of time-domain resources that include one or more of radio frames, subframes, slots, and/or symbols.

In a third aspect, process 700 includes determining (e.g., using receive processor 258, transmit processor 264, controller/processor 280, memory 282, determination component 910, and/or the like) a quantity of time-domain resources for the first time offset based at least in part on a rounding operation applied to the difference in starting time between the uplink radio frame and the corresponding downlink radio frame.

In a fourth aspect, process 700 includes determining (e.g., using receive processor 258, transmit processor 264, controller/processor 280, memory 282, determination component 910, and/or the like) at least a portion of the first time offset independently of a timing advance command received from a satellite or a base station. In a fifth aspect, process 700 includes determining (e.g., using receive processor 258, transmit processor 264, controller/processor 280, memory 282, determination component 910, and/or the like) the at least the portion of the first time offset based at least in part on geolocation information associated with the UE.

In a sixth aspect, the time period is determined based at least in part on the first time offset only if the first time offset exceeds a threshold. In a seventh aspect, the first time offset is indicated as a difference between a threshold and the difference in starting time between the uplink radio frame and the corresponding downlink radio frame. In an eighth aspect, the second time offset is explicitly signaled to the UE by a satellite or a base station.

In a ninth aspect, the network-indicated offset is based at least in part on at least one of a maximum timing advance value across a group of UEs, a minimum timing advance value across a group of UEs, or a common timing advance value across a group of UEs. In a tenth aspect, process 700 includes transmitting (e.g., using controller/processor 280, transmit processor 264, TX MIMO processor 266, MOD 254, antenna 252, memory 282, transmission component 904, and/or the like) an indication of the first time offset to a satellite or a base station.

In an eleventh aspect, the second time offset depends on a round trip time associated with the UE or a group of UEs including the UE and a satellite or a base station serving the UE or the group of UEs. In a twelfth aspect, the time period corresponds to one or more time-domain resources that precede a starting time-domain resource for the uplink transmission. In a thirteenth aspect, the time period corresponds to a guard period that comprises at least one of one or more time-domain resources before a starting time-domain resource for the uplink transmission, or one or more time-domain resources after an ending time-domain resource for the uplink transmission. In a fourteenth aspect, the time period corresponds to one or more time-domain resources that follow an ending time-domain resource for the uplink transmission.

In a fifteenth aspect, process 700 includes refraining from monitoring (e.g., using antenna 252, DEMOD 254, MIMO detector 256, receive processor 258, controller/processor 280, memory 282, reception component 902, and/or the like) for downlink communications in the determined time period. In a sixteenth aspect, the time period is determined based at least in part on the UE operating in a half-duplex mode. In a seventeenth aspect, the time period is determined based at least in part on the UE communicating with a non-terrestrial network satellite or base station. In an eighteenth aspect, the uplink transmission comprises at least one of a PUSCH transmission, an NPUSCH format 1 transmission, an NPUSCH format 2 transmission, or a PUCCH transmission.

In a nineteenth aspect, alone or in combination with one or more of the first through eighteenth aspects, determining the time period includes determining the time period is based at least in part on receiving a downlink indication from the satellite or base station that the satellite or base station has received the indication of the first time offset. In a twentieth aspect, alone or in combination with one or more of the first through nineteenth aspects, determining the time period includes determining downlink time-domain resource indices corresponding to the time period based at least in part on subtracting at least one of the first time offset, the second time offset, or the network-indicated offset, from an uplink time-domain resource index corresponding to a beginning or end of the uplink transmission.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
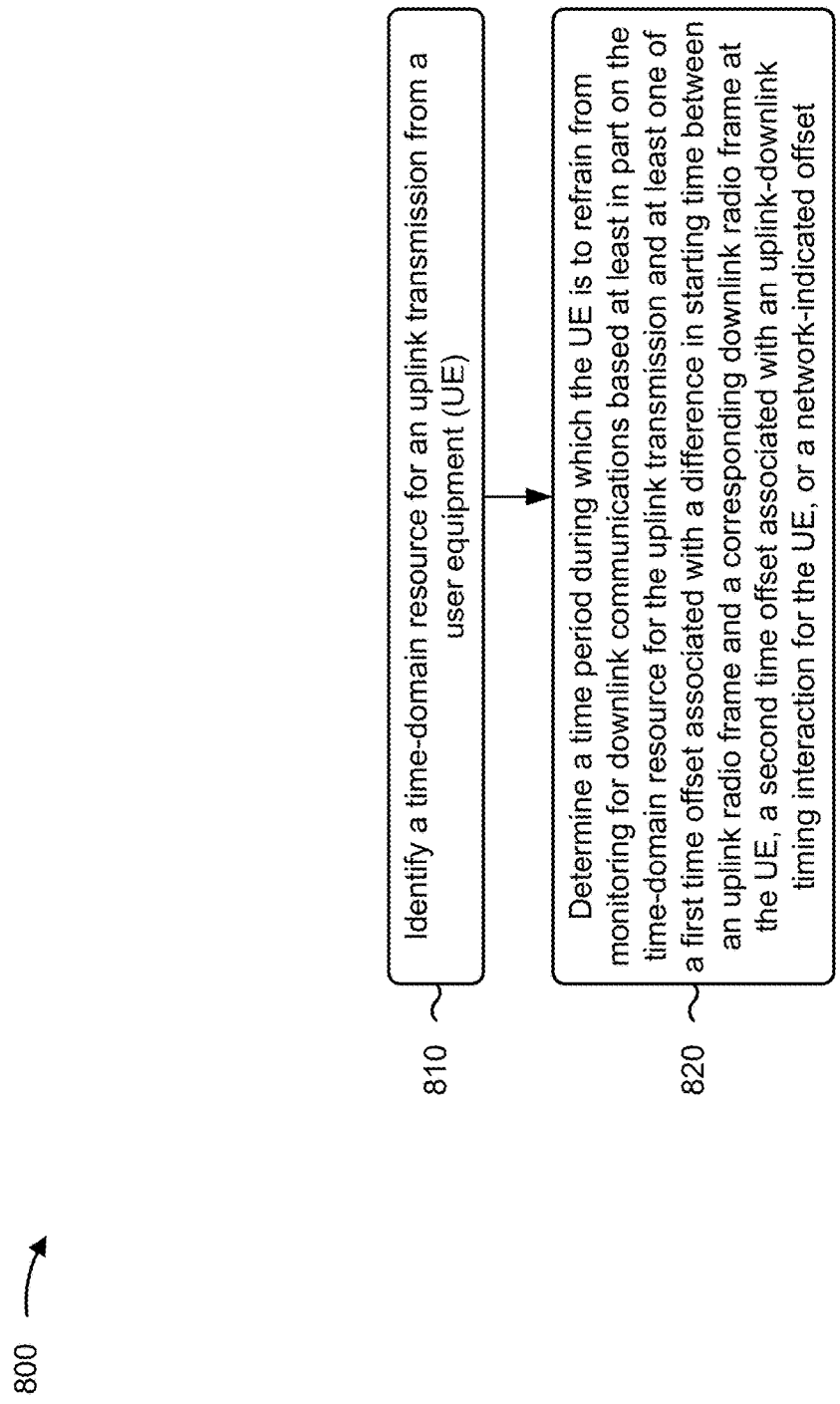

FIG. 8 is a diagram illustrating an example process 800 performed, for example, by a base station, in accordance with the present disclosure. Example process 800 is an example where the base station (e.g., base station 110, satellite 110f, satellite 420, satellite 440, and/or the like) performs operations associated with determining interrupted time domain resources for a half-duplex UE with a large timing advance.

As shown in FIG. 8, in some aspects, process 800 may include identifying a time-domain resource for an uplink transmission from a UE (block 810). For example, the base station (e.g., using transmit processor 220, receive processor 238, controller/processor 240, memory 242, identification component 1108, and/or the like) may identify a time-domain resource for an uplink transmission from a UE, as described above in connection with FIGS. 6A-6C.

As further shown in FIG. 8, in some aspects, process 800 may include determining a time period during which the UE is to refrain from monitoring for downlink communications based at least in part on the time-domain resource for the uplink transmission and at least one of a first time offset associated with a difference in starting time between an uplink radio frame and a corresponding downlink radio frame at the UE, a second time offset associated with an uplink-downlink timing interaction for the UE, or a network-indicated offset (block 820). For example, the base station (e.g., using transmit processor 220, receive processor 238, controller/processor 240, memory 242, determination component 1110, and/or the like) may determine a time period during which the UE is to refrain from monitoring for downlink communications based at least in part on the time-domain resource for the uplink transmission and at least one of a first time offset associated with a difference in starting time between an uplink radio frame and a corresponding downlink radio frame at the UE, a second time offset associated with an uplink-downlink timing interaction for the UE, or a network-indicated offset, as described above in connection with FIGS. 6A-6C.

Process 800 may include additional aspects, such as any single aspect or any combination of aspects described below and/or in connection with one or more other processes described elsewhere herein.

In a first aspect, process 800 includes receiving (e.g., using antenna 234, DEMOD 232, MIMO detector 236, receive processor 238, controller/processor 240, memory 242, reception component 1102, and/or the like) an indication of the first time offset from the UE. In a second aspect, process 800 includes refraining from scheduling (e.g., using controller/processor 240, transmit processor 220, TX MIMO processor 230, MOD 232, antenna 234, memory 242, scheduler 246, transmission component 1104, and/or the like) a downlink communication, for the UE, that occurs in the time period.

In a third aspect, the time period is determined based at least in part on the first time offset only if the first time offset exceeds a threshold. In a fourth aspect, the first time offset is indicated as a difference between a threshold and the difference in starting time between the uplink radio frame and the corresponding downlink radio frame. In a fifth aspect, process 800 includes transmitting (e.g., using controller/processor 240, transmit processor 220, TX MIMO processor 230, MOD 232, antenna 234, memory 242, transmission component 1104, and/or the like) an explicit indication of the second time offset to the UE.

In a sixth aspect, process 800 includes determining (e.g., using receive processor 258, transmit processor 264, controller/processor 280, memory 282, determination component 1110, and/or the like) the network-indicated offset based on at least one of a maximum timing advance value across a group of UEs, a minimum timing advance value across a group of UEs, or a common timing advance value across a group of UEs. In a seventh aspect, the second time offset depends on a round trip time associated with the UE our a group of UEs including the UE and the base station.

In an eighth aspect, the time period corresponds to one or more time-domain resources that precede a starting time-domain resource for the uplink transmission. In a ninth aspect, the time period corresponds to a guard period that comprises at least one of one or more time-domain resources before a starting time-domain resource for the uplink transmission, or one or more time-domain resources after an ending time-domain resource for the uplink transmission. In a tenth aspect, the time period corresponds to one or more time-domain resources that follow an ending time-domain resource for the uplink transmission.

In an eleventh aspect, the time period is determined based at least in part on the UE operating in a half-duplex mode. In a twelfth aspect, the time period is determined based at least in part on the base station being a non-terrestrial network satellite. In a thirteenth aspect, the uplink transmission comprises at least one of a PUSCH transmission, an NPUSCH format 1 transmission, an NPUSCH format 2 transmission, or a PUCCH transmission. In a fourteenth aspect, alone or in combination with one or more of the first through thirteenth aspects, determining the time period includes determining downlink time-domain resource indices corresponding to the time period based at least in part on subtracting at least one of the first time offset, the second time offset, or the network-indicated offset, from an uplink time-domain resource index corresponding to a beginning or end of the uplink transmission.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

FIG. 9 is a block diagram of an example apparatus 900 for wireless communication, in accordance with the present disclosure. The apparatus 900 may be a UE 120, or a UE 120 may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include one or more of an identification component 908 or a determination component 910, among other examples.

In some aspects, the apparatus 900 may be configured to perform one or more operations described herein in connection with FIGS. 6A-6C. Additionally or alternatively, the apparatus 900 may be configured to perform one or more processes described herein, such as process 700 of FIG. 7. In some aspects, the apparatus 900 and/or one or more components shown in FIG. 9 may include one or more components of the UE described above in connection with FIG. 2. Additionally, or alternatively, one or more components shown in FIG. 9 may be implemented within one or more components described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 906. In some aspects, the reception component 902 may include one or more antennas, a demodulator, a MIMO detector, a receive processor, a controller/processor, a memory, or a combination thereof, of the UE described above in connection with FIG. 2.

The transmission component 904 may transmit communications, such as reference signals, control information, data communications, or a combination thereof, to the apparatus 906. In some aspects, one or more other components of the apparatus 906 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modulator, a transmit MIMO processor, a transmit processor, a controller/processor, a memory, or a combination thereof, of the UE described above in connection with FIG. 2. In some aspects, the transmission component 904 may be collocated with the reception component 902 in a transceiver.

The identification component 908 may identify a time-domain resource for an uplink transmission. The determination component 910 may determine a time period, during which the apparatus 900 is to refrain from monitoring for downlink communications, based at least in part on the time-domain resource for the uplink transmission and at least one of a first time offset associated with a difference in starting time between an uplink radio frame and a corresponding downlink radio frame at the apparatus 900, a second time offset associated with an uplink-downlink timing interaction for the apparatus 900, or a network-indicated offset. In some aspects, the determination component 910 may include a receive processor, a transmit processor, a controller/processor, a memory, or a combination thereof, of the UE described above in connection with FIG. 2.

In some aspects, the identification component 908 may include one or more a receive processor, a modulator, a transmit MIMO processor, a transmit processor, a controller/processor, a memory, or a combination thereof, of the UE described above in connection with FIG. 2. In some aspects, the identification component 908 may be a memory. In some aspects, the identification component 908 may one or more processors coupled to the memory, the memory and the one or more processors configured to identify a time-domain resource for an uplink transmission. In some aspects, the identification component 908 may one or more instructions that, when executed by one or more processors of a UE, cause the UE to identify a time-domain resource for an uplink transmission.

In some aspects, the determination component 910 may include one or more a receive processor, a modulator, a transmit MIMO processor, a transmit processor, a controller/processor, a memory, or a combination thereof, of the UE described above in connection with FIG. 2. In some aspects, the determination component 910 may be a memory. In some aspects, the determination component 910 may one or more processors coupled to the memory, the memory and the one or more processors configured to determine a time period during which the apparatus 900 is to refrain from monitoring for downlink communications. In some aspects, the determination component 910 may one or more instructions that, when executed by one or more processors of a UE, cause the UE to determine a time period during which the apparatus 900 is to refrain from monitoring for downlink communications.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally or alternatively, a set of (one or more) components shown in FIG. 9 may perform one or more functions described as being performed by another set of components shown in FIG. 9.

Figure 10:
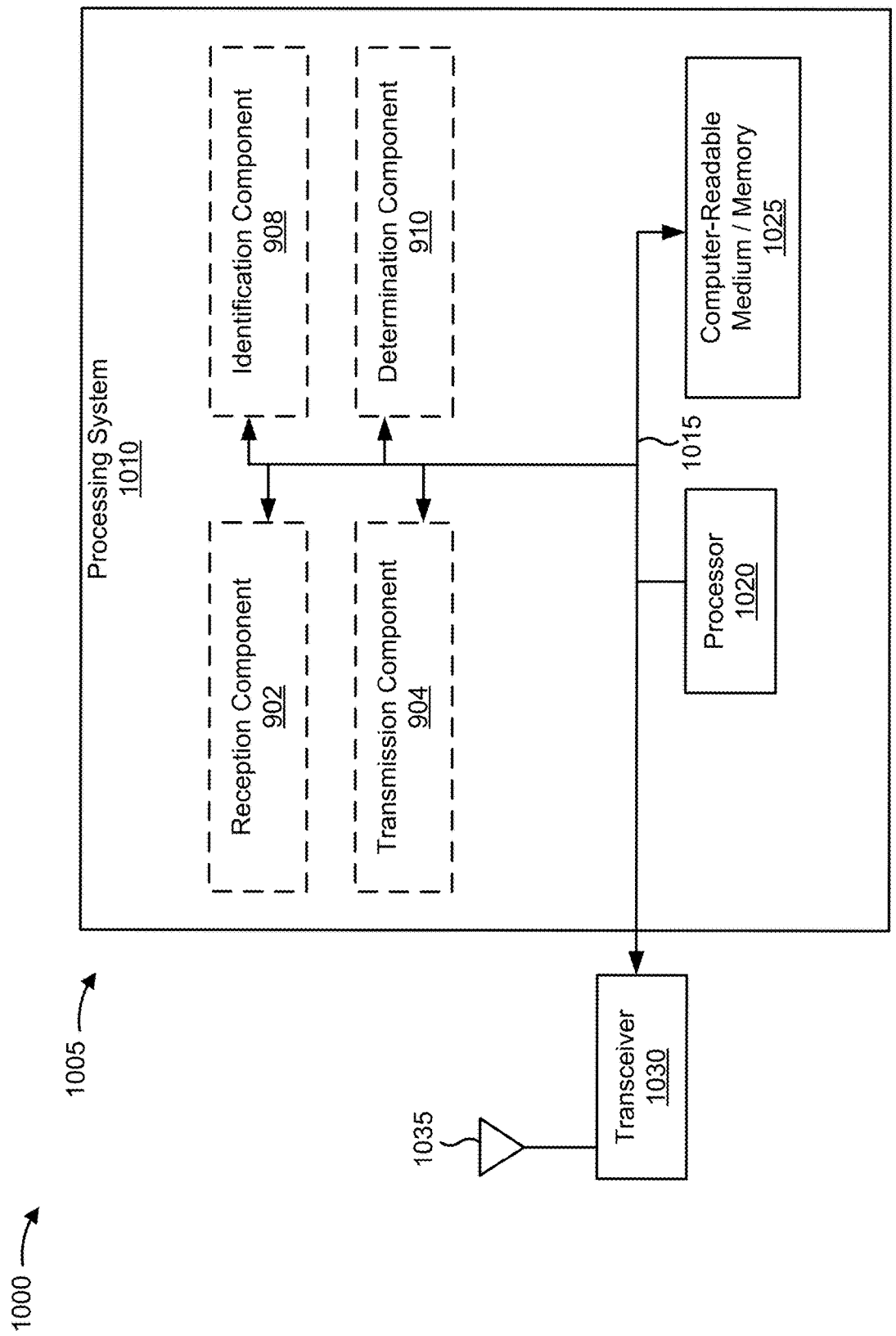
FIG. 10 is a diagram illustrating an example of a hardware implementation for an apparatus employing a processing system, in accordance with the present disclosure.

FIG. 10 is a diagram illustrating an example 1000 of a hardware implementation for an apparatus 1005 employing a processing system 1010, in accordance with the present disclosure. The apparatus 1005 may be a UE 120 or an apparatus 900.

The processing system 1010 may be implemented with a bus architecture, represented generally by the bus 1015. The bus 1015 may include any number of interconnecting buses and bridges depending on the specific application of the processing system 1010 and the overall design constraints. The bus 1015 links together various circuits including one or more processors and/or hardware components, represented by the processor 1020, the illustrated components, and the computer-readable medium/memory 1025. The bus 1015 may also link various other circuits, such as timing sources, peripherals, voltage regulators, power management circuits, and/or the like.

The processing system 1010 may be coupled to a transceiver 1030. The transceiver 1030 is coupled to one or more antennas 1035. The transceiver 1030 provides a means for communicating with various other apparatuses over a transmission medium. The transceiver 1030 receives a signal from the one or more antennas 1035, extracts information from the received signal, and provides the extracted information to the processing system 1010, specifically the reception component 902. In addition, the transceiver 1030 receives information from the processing system 1010, specifically the transmission component 904, and generates a signal to be applied to the one or more antennas 1035 based at least in part on the received information.

The processing system 1010 includes a processor 1020 coupled to a computer-readable medium/memory 1025. The processor 1020 is responsible for general processing, including the execution of software stored on the computer-readable medium/memory 1025. The software, when executed by the processor 1020, causes the processing system 1010 to perform the various functions described herein for any particular apparatus. The computer-readable medium/memory 1025 may also be used for storing data that is manipulated by the processor 1020 when executing software. The processing system further includes at least one of the illustrated components. The components may be software modules running in the processor 1020, resident/stored in the computer readable medium/memory 1025, one or more hardware modules coupled to the processor 1020, or some combination thereof.

In some aspects, the processing system 1010 may be a component of the UE 120 and may include the memory 282 and/or at least one of the TX MIMO processor 266, the RX processor 258, and/or the controller/processor 280. In some aspects, the apparatus 1005 for wireless communication includes means for identifying a time-domain resource for an uplink transmission, means for determining a time period, during which the apparatus 1005 is to refrain from monitoring for downlink communications, based at least in part on the time-domain resource for the uplink transmission and at least one of a first time offset associated with a difference in starting time between an uplink radio frame and a corresponding downlink radio frame at the apparatus 1005, a second time offset associated with an uplink-downlink timing interaction for the apparatus 1005, or a network-indicated offset. The aforementioned means may be one or more of the aforementioned components of the apparatus 900 and/or the processing system 1010 of the apparatus 1005 configured to perform the functions recited by the aforementioned means. As described elsewhere herein, the processing system 1010 may include the TX MIMO processor 266, the RX processor 258, and/or the controller/processor 280. In one configuration, the aforementioned means may be the TX MIMO processor 266, the RX processor 258, and/or the controller/processor 280 configured to perform the functions and/or operations recited herein.

FIG. 10 is provided as an example. Other examples may differ from what is described in connection with FIG. 10.

FIG. 11 is a block diagram of an example apparatus 1100 for wireless communication, in accordance with the present disclosure. The apparatus 1100 may be a base station 110 (or a satellite 110f), or a base station 110 (or a satellite 110f) may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include one or more of an identification component 1108 or a determination component 1110, among other examples.

In some aspects, the apparatus 1100 may be configured to perform one or more operations described herein in connection with FIGS. 6A-6C. Additionally or alternatively, the apparatus 1100 may be configured to perform one or more processes described herein, such as process 800 of FIG. 8. In some aspects, the apparatus 1100 and/or one or more components shown in FIG. 11 may include one or more components of the base station or satellite described above in connection with FIG. 2. Additionally, or alternatively, one or more components shown in FIG. 11 may be implemented within one or more components described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1106. In some aspects, the reception component 1102 may include one or more antennas, a demodulator, a MIMO detector, a receive processor, a controller/processor, a memory, or a combination thereof, of the base station or satellite described above in connection with FIG. 2.

The transmission component 1104 may transmit communications, such as reference signals, control information, data communications, or a combination thereof, to the apparatus 1106. In some aspects, one or more other components of the apparatus 1106 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modulator, a transmit MIMO processor, a transmit processor, a controller/processor, a memory, or a combination thereof, of the base station or satellite described above in connection with FIG. 2. In some aspects, the transmission component 1104 may be collocated with the reception component 1102 in a transceiver.

The identification component 1108 may identify a time-domain resource for an uplink transmission. The determination component 1110 may determine a time period, during which the apparatus 1106 is to refrain from monitoring for downlink communications, based at least in part on the time-domain resource for the uplink transmission and at least one of a first time offset associated with a difference in starting time between an uplink radio frame and a corresponding downlink radio frame at the apparatus 1106, a second time offset associated with an uplink-downlink timing interaction for the apparatus 1106, or a network-indicated offset. In some aspects, the identification component 1108 may one or more instructions that, when executed by one or more processors of a base station or satellite, cause the base station or satellite to identify a time-domain resource for an uplink transmission.

The identification component 1108 may include a receive processor, a modulator, a transmit processor, a controller/processor, a memory, or a combination thereof, of the base station or satellite described above in connection with FIG. 2. In some aspects, the identification component 1108 may a memory. In some aspects, the identification component 1108 may one or more processors coupled to the memory, the memory and the one or more processors configured to identify a time-domain resource for an uplink transmission. In some aspects, the determination component 1110 may one or more instructions that, when executed by one or more processors of a base station or satellite, cause the base station or satellite to determine a time period during which a UE is to refrain from monitoring for downlink communications.

The determination component 1110 may include a receive processor, a modulator, a transmit processor, a controller/processor, a memory, or a combination thereof, of the base station or satellite described above in connection with FIG. 2. In some aspects, the determination component 1110 may a memory. In some aspects, the determination component 1110 may one or more processors coupled to the memory, the memory and the one or more processors configured to determine a time period during which the apparatus 1106 is to refrain from monitoring for downlink communications.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally or alternatively, a set of (one or more) components shown in FIG. 11 may perform one or more functions described as being performed by another set of components shown in FIG. 11.

Figure 12:
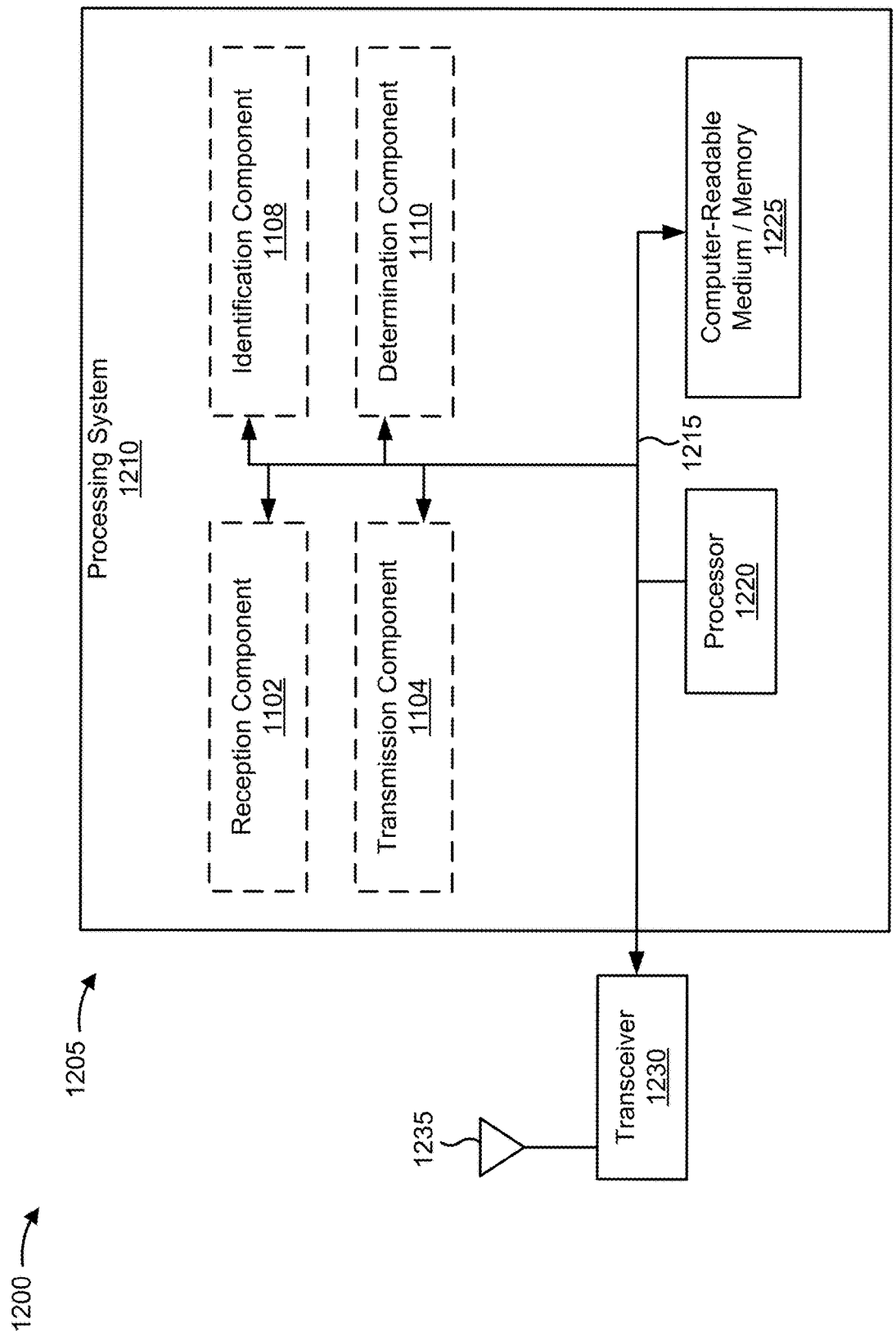
FIG. 12 is a diagram illustrating an example of a hardware implementation for an apparatus employing a processing system, in accordance with the present disclosure.

FIG. 12 is a diagram illustrating an example 1200 of a hardware implementation for an apparatus 1205 employing a processing system 1210, in accordance with the present disclosure. The apparatus 1205 may be a base station, a satellite, or an apparatus 1100.

The processing system 1210 may be implemented with a bus architecture, represented generally by the bus 1215. The bus 1215 may include any number of interconnecting buses and bridges depending on the specific application of the processing system 1210 and the overall design constraints. The bus 1215 links together various circuits including one or more processors and/or hardware components, represented by the processor 1220, the illustrated components, and the computer-readable medium/memory 1225. The bus 1215 may also link various other circuits, such as timing sources, peripherals, voltage regulators, power management circuits, and/or the like.

The processing system 1210 may be coupled to a transceiver 1230. The transceiver 1230 is coupled to one or more antennas 1235. The transceiver 1230 provides a means for communicating with various other apparatuses over a transmission medium. The transceiver 1230 receives a signal from the one or more antennas 1235, extracts information from the received signal, and provides the extracted information to the processing system 1210, specifically the reception component 1102. In addition, the transceiver 1230 receives information from the processing system 1210, specifically the transmission component 1104, and generates a signal to be applied to the one or more antennas 1235 based at least in part on the received information.

The processing system 1210 includes a processor 1220 coupled to a computer-readable medium/memory 1225. The processor 1220 is responsible for general processing, including the execution of software stored on the computer-readable medium/memory 1225. The software, when executed by the processor 1220, causes the processing system 1210 to perform the various functions described herein for any particular apparatus. The computer-readable medium/memory 1225 may also be used for storing data that is manipulated by the processor 1220 when executing software. The processing system further includes at least one of the illustrated components. The components may be software modules running in the processor 1220, resident/stored in the computer readable medium/memory 1225, one or more hardware modules coupled to the processor 1220, or some combination thereof.

In some aspects, the processing system 1210 may be a component of the base station 110 and may include the memory 242 and/or at least one of the TX MIMO processor 230, the RX processor 238, and/or the controller/processor 240. In some aspects, the apparatus 1205 for wireless communication includes identifying a time-domain resource for an uplink transmission from a UE, means for determining a time period during which the UE is to refrain from monitoring for downlink communications based at least in part on the time-domain resource for the uplink transmission and at least one of a first time offset associated with a difference in starting time between an uplink radio frame and a corresponding downlink radio frame at the UE, a second time offset associated with an uplink-downlink timing interaction for the UE, or a network-indicated offset.

The aforementioned means may be one or more of the aforementioned components of the apparatus 1100 and/or the processing system 1210 of the apparatus 1205 configured to perform the functions recited by the aforementioned means. As described elsewhere herein, the processing system 1210 may include the TX MIMO processor 230, the receive processor 238, and/or the controller/processor 240. In one configuration, the aforementioned means may be the TX MIMO processor 230, the receive processor 238, and/or the controller/processor 240 configured to perform the functions and/or operations recited herein.

FIG. 12 is provided as an example. Other examples may differ from what is described in connection with FIG. 12.

The following provides an overview of some Aspects of the present disclosure:

Aspect 1: A method of wireless communication performed by a user equipment (UE), comprising: identifying a time-domain resource for an uplink transmission; and determining a time period, during which the UE is to refrain from monitoring for downlink communications, based at least in part on the time-domain resource for the uplink transmission and at least one of: a first time offset associated with a difference in starting time between an uplink radio frame and a corresponding downlink radio frame at the UE, a second time offset associated with an uplink-downlink timing interaction for the UE, or a network-indicated offset.

Aspect 2: The method of Aspect 1, wherein the first time offset includes or is based at least in part on a timing advance parameter associated with the UE. Aspect 3: The method of Aspect 1 or 2, wherein the first time offset, the second time offset, or both are indicated as a quantity of time-domain resources that include one or more of radio frames, subframes, slots, and/or symbols. Aspect 4: The method of Aspect 3, further comprising: determining a quantity of time-domain resources for the first time offset based at least in part on a rounding operation applied to the difference in starting time between the uplink radio frame and the corresponding downlink radio frame. Aspect 5: The method of any of Aspects 1-4, further comprising: determining at least a portion of the first time offset independently of a timing advance command received from a satellite or a base station. Aspect 6: The method of Aspect 5, further comprising: determining the at least the portion of the first time offset based at least in part on geolocation information associated with the UE.

Aspect 7: The method of any of Aspects 1-6, wherein the time period is determined based at least in part on the first time offset only if the first time offset exceeds a threshold. Aspect 8: The method of any of Aspects 1-7, wherein the first time offset is indicated as a difference between a threshold and the difference in starting time between the uplink radio frame and the corresponding downlink radio frame. Aspect 9: The method of any of Aspects 1-8, wherein the second time offset is explicitly signaled to the UE by a satellite or a base station. Aspect 10: The method of any of Aspects 1-9, wherein the network-indicated offset is based at least in part on at least one of: a maximum timing advance value across a group of UEs, a minimum timing advance value across a group of UEs, or a common timing advance value across a group of UEs. Aspect 11: The method of any of Aspects 1-10, further comprising transmitting an indication of the first time offset to a satellite or a base station. Aspect 12: The method of Aspect 11, wherein determining the time period comprises: determining the time period is based at least in part on receiving a downlink indication from the satellite or base station that the satellite or base station has received the indication of the first time offset.

Aspect 13: The method of any of Aspects 1-12, wherein the second time offset depends on a round trip time associated with the UE or with a group of UEs including the UE, and a satellite or a base station serving the UE or the group of UEs including the UE. Aspect 14: The method of any of Aspects 1-13, wherein the time period corresponds to one or more time-domain resources that precede a starting time-domain resource for the uplink transmission. Aspect 15: The method of any of Aspects 1-14, wherein the time period corresponds to a guard period that comprises at least one of one or more time-domain resources before a starting time-domain resource for the uplink transmission, or one or more time-domain resources after an ending time-domain resource for the uplink transmission. Aspect 16: The method of any of Aspects 1-15, wherein the time period corresponds to one or more time-domain resources that follow an ending time-domain resource for the uplink transmission.

Aspect 17: The method of any of Aspects 1-16, further comprising refraining from monitoring for downlink communications in the determined time period. Aspect 18: The method of any of Aspects 1-17, wherein the time period is determined based at least in part on the UE operating in a half-duplex mode. Aspect 19: The method of any of Aspects 1-18, wherein the time period is determined based at least in part on the UE communicating with a non-terrestrial network satellite or base station. Aspect 20: The method of any of Aspects 1-19, wherein the uplink transmission comprises at least one of: a physical uplink shared channel (PUSCH) transmission, a narrowband PUSCH (NPUSCH) format 1 transmission, an NPUSCH format 2 transmission, a physical random access channel (PRACH) transmission, a narrowband PRACH (NPRACH) transmission, or a physical uplink control channel (PUCCH) transmission. Aspect 21: The method of any of Aspects 1-20, wherein determining the time period comprises: determining downlink time-domain resource indices corresponding to the time period based at least in part on subtracting at least one of the first time offset, the second time offset, or the network-indicated offset, from an uplink time-domain resource index corresponding to a beginning or end of the uplink transmission.

Aspect 22: A method of wireless communication performed by a base station, comprising: identifying a time-domain resource for an uplink transmission from a user equipment (UE); and determining a time period during which the UE is to refrain from monitoring for downlink communications based at least in part on the time-domain resource for the uplink transmission and at least one of: a first time offset associated with a difference in starting time between an uplink radio frame and a corresponding downlink radio frame at the UE, a second time offset associated with an uplink-downlink timing interaction for the UE, or a network-indicated offset.

Aspect 23: The method of Aspect 22, further comprising receiving an indication of the first time offset from the UE. Aspect 24: The method of Aspect 22 or 23, further comprising refraining from scheduling a downlink communication, for the UE, that occurs in the time period. Aspect 25: The method of any of Aspects 22-24, wherein the time period is determined based at least in part on the first time offset only if the first time offset exceeds a threshold. Aspect 26: The method of any of Aspects 22-25, wherein the first time offset is indicated as a difference between a threshold and the difference in starting time between the uplink radio frame and the corresponding downlink radio frame. Aspect 27: The method of any of Aspects 22-26, further comprising transmitting an explicit indication of the second time offset to the UE. Aspect 28: The method of any of Aspects 22-27, further comprising determining the network-indicated offset based on at least one of: a maximum timing advance value across a group of UEs, a minimum timing advance value across a group of UEs, or a common timing advance value across a group of UEs.

Aspect 29: The method of any of Aspects 22-28, wherein the second time offset depends on a round trip time associated with the UE or a group of UEs including the UE, and the base station. Aspect 30: The method of any of Aspects 22-29, wherein the time period corresponds to one or more time-domain resources that precede a starting time-domain resource for the uplink transmission. Aspect 31: The method of any of Aspects 22-30, wherein the time period corresponds to a guard period that comprises at least one of one or more time-domain resources before a starting time-domain resource for the uplink transmission, or one or more time-domain resources after an ending time-domain resource for the uplink transmission. Aspect 32: The method of any of Aspects 22-31, wherein the time period corresponds to one or more time-domain resources that follow an ending time-domain resource for the uplink transmission. Aspect 33: The method of any of Aspects 22-32, wherein the time period is determined based at least in part on the UE operating in a half-duplex mode. Aspect 34: The method of any of Aspects 22-33, wherein the time period is determined based at least in part on the base station being a non-terrestrial network satellite.

Aspect 35: The method of any of Aspects 22-34, wherein the uplink transmission comprises at least one of: a physical uplink shared channel (PUSCH) transmission, a narrowband PUSCH (NPUSCH) format 1 transmission, an NPUSCH format 2 transmission, a physical random access channel (PRACH) transmission, a narrowband PRACH (NPRACH) transmission, or a physical uplink control channel (PUCCH) transmission. Aspect 36: The method of any of Aspects 22-35, wherein determining the time period comprises: determining downlink time-domain resource indices corresponding to the time period based at least in part on subtracting at least one of the first time offset, the second time offset, or the network-indicated offset, from an uplink time-domain resource index corresponding to a beginning or end of the uplink transmission.

Aspect 37: An apparatus for wireless communication at a device, comprising a processor; memory coupled with the processor; and instructions stored in the memory and executable by the processor to cause the apparatus to perform the method of one or more of Aspects 1-21. Aspect 38: A device for wireless communication, comprising a memory and one or more processors coupled to the memory, the one or more processors configured to perform the method of one or more of Aspects 1-21. Aspect 39: An apparatus for wireless communication, comprising at least one means for performing the method of one or more of Aspects 1-21. Aspect 40: A non-transitory computer-readable medium storing code for wireless communication, the code comprising instructions executable by a processor to perform the method of one or more of Aspects 1-21. Aspect 41: A non-transitory computer-readable medium storing a set of instructions for wireless communication, the set of instructions comprising one or more instructions that, when executed by one or more processors of a device, cause the device to perform the method of one or more of Aspects 1-21.

Aspect 42: An apparatus for wireless communication at a device, comprising a processor; memory coupled with the processor; and instructions stored in the memory and executable by the processor to cause the apparatus to perform the method of one or more of Aspects 22-36. Aspect 43: A device for wireless communication, comprising a memory and one or more processors coupled to the memory, the one or more processors configured to perform the method of one or more of Aspects 22-36. Aspect 44: An apparatus for wireless communication, comprising at least one means for performing the method of one or more of Aspects 22-36. Aspect 45: A non-transitory computer-readable medium storing code for wireless communication, the code comprising instructions executable by a processor to perform the method of one or more of Aspects 22-36. Aspect 46: A non-transitory computer-readable medium storing a set of instructions for wireless communication, the set of instructions comprising one or more instructions that, when executed by one or more processors of a device, cause the device to perform the method of one or more of Aspects 22-36.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
   identifying a time-domain resource for an uplink transmission; and
   determining a time period, during which the UE is to refrain from monitoring for downlink communications, based at least in part on:
      the time-domain resource for the uplink transmission,
      a first time offset associated with a difference in starting time between an uplink radio frame and a corresponding downlink radio frame at the UE, and
      at least one of:
         the UE operating in a half-duplex mode, or
         the UE communicating with a non-terrestrial network satellite.

2. The method of claim 1, wherein the first time offset includes or is based at least in part on a timing advance parameter associated with the UE.

3. The method of claim 1, wherein the first time offset is indicated as a quantity of time-domain resources that include one or more of radio frames, subframes, slots, or symbols.

4. The method of claim 3, further comprising:
   determining a quantity of time-domain resources for the first time offset based at least in part on a rounding operation applied to the difference in starting time between the uplink radio frame and the corresponding downlink radio frame.

5. The method of claim 1, further comprising:
   determining at least a portion of the first time offset independently of a timing advance command received from a satellite or a base station.

6. The method of claim 5, wherein the at least the portion of the first time offset is determined based at least in part on geolocation information associated with the UE.

7. The method of claim 1, wherein the first time offset exceeds a threshold.

8. The method of claim 1, wherein the first time offset is indicated as a difference between a threshold and the difference in starting time between the uplink radio frame and the corresponding downlink radio frame.

9. The method of claim 1, wherein the time period is further determined based at least in part on a network-indicated offset.

10. The method of claim 1, further comprising transmitting an indication of the first time offset to the non-terrestrial network satellite.

11. The method of claim 10, wherein determining the time period comprises:
determining the time period is based at least in part on receiving a downlink indication from the non-terrestrial network satellite or a non-terrestrial network node that the non-terrestrial network satellite or a non-terrestrial network node has received the indication of the first time offset.

12. A method of wireless communication performed by a network node, comprising:
identifying a time-domain resource for an uplink transmission from a user equipment (UE); and
determining a time period during which the UE is to refrain from monitoring for downlink communications based at least in part on:
the time-domain resource for the uplink transmission,
a first time offset associated with a difference in starting time between an uplink radio frame and a corresponding downlink radio frame at the UE, and
at least one of:
the UE operating in a half-duplex mode, or
the network node being a non-terrestrial network satellite.

13. The method of claim 12, further comprising:
receiving an indication of the first time offset from the UE.

14. The method of claim 12, further comprising:
refraining from scheduling a downlink communication, for the UE, that occurs in the time period.

15. The method of claim 12, wherein the first time offset exceeds a threshold.

16. The method of claim 12, wherein the first time offset is indicated as a difference between a threshold and the difference in starting time between the uplink radio frame and the corresponding downlink radio frame.

17. The method of claim 12, wherein the time period is further determined based at least in part on a network-indicated offset.

18. The method of claim 12, wherein the time period is further determined based at least in part on a second time offset associated with an uplink-downlink timing interaction for the UE.

19. A user equipment (UE) for wireless communication, comprising:
a memory; and
one or more processors coupled to the memory, the one or more processors configured to:
identify a time-domain resource for an uplink transmission; and
determine a time period, during which the UE is to refrain from monitoring for downlink communications, based at least in part on:
the time-domain resource for the uplink transmission,
a first time offset associated with a difference in starting time between an uplink radio frame and a corresponding downlink radio frame at the UE, and
at least one of:
the UE operating in a half-duplex mode, or
the UE communicating with a non-terrestrial network satellite.

20. The UE of claim 19, wherein the time period is determined based at least in part on a second time offset associated with an uplink-downlink timing interaction for the UE.

21. The UE of claim 19, wherein the time period corresponds to:
one or more time-domain resources that precede a starting time-domain resource for the uplink transmission,
one or more time-domain resources that follow an ending time-domain resource for the uplink transmission, or
a guard period that comprises at least one of:
one or more time-domain resources before a starting time-domain resource for the uplink transmission, or
one or more time-domain resources after an ending time-domain resource for the uplink transmission.

22. The UE of claim 19, wherein the one or more processors are further configured to refrain from monitoring for downlink communications in the time period.

23. The UE of claim 19, wherein the time period is determined based at least in part on:
the UE operating in the half-duplex mode, and
the UE communicating with the non-terrestrial network satellite.

24. The UE of claim 19, wherein the uplink transmission comprises at least one of:
a physical uplink shared channel (PUSCH) transmission,
a narrowband PUSCH (NPUSCH) format 1 transmission,
an NPUSCH format 2 transmission,
a physical random access channel (PRACH) transmission,
a narrowband PRACH (NPRACH) transmission, or
a physical uplink control channel (PUCCH) transmission.

25. The UE of claim 19, wherein the one or more processors, to determine the time period, are configured to:
determine downlink time-domain resource indices corresponding to the time period based at least in part on subtracting the first time offset from an uplink time-domain resource index corresponding to a beginning or end of the uplink transmission.

26. A network node for wireless communication, comprising:
a memory; and
one or more processors coupled to the memory, the one or more processors configured to:
identify a time-domain resource for an uplink transmission from a user equipment (UE); and
determine a time period during which the UE is to refrain from monitoring for downlink communications based at least in part on:
the time-domain resource for the uplink transmission,
a first time offset associated with a difference in starting time between an uplink radio frame and a corresponding downlink radio frame at the UE, and
at least one of:
the UE operating in a half-duplex mode, or
the network node being a non-terrestrial network satellite.

27. The network node of claim 26, wherein the time period corresponds to:
one or more time-domain resources that precede a starting time-domain resource for the uplink transmission,
one or more time-domain resources that follow an ending time-domain resource for the uplink transmission, or
a guard period that comprises at least one of:

one or more time-domain resources before a starting time-domain resource for the uplink transmission, or one or more time-domain resources after an ending time-domain resource for the uplink transmission.

28. The network node of claim 26, wherein the time period is determined based at least in part on:
   the UE operating in the half-duplex mode, and
   the network node being the non-terrestrial network satellite.

29. The network node of claim 26, wherein the uplink transmission comprises at least one of:
   a physical uplink shared channel (PUSCH) transmission, a narrowband PUSCH (NPUSCH) format 1 transmission, an NPUSCH format 2 transmission, a physical random access channel (PRACH) transmission, a narrowband PRACH (NPRACH) transmission, or a physical uplink control channel (PUCCH) transmission.

30. The network node of claim 26, wherein the one or more processors, to determine the time period, are configured to:
   determine downlink time-domain resource indices corresponding to the time period based at least in part on subtracting the first time offset from an uplink time-domain resource index corresponding to a beginning or end of the uplink transmission.

\* \* \* \* \*